(12) United States Patent
Takahashi et al.

(10) Patent No.: US 6,520,131 B2
(45) Date of Patent: Feb. 18, 2003

(54) VALVE TIMING CONTROL SYSTEM FOR INTERNAL COMBUSTION ENGINE

(75) Inventors: Tatsuhiko Takahashi, Hyogo-ken (JP); Morio Fujiwara, Tokyo (JP); Koji Wada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/912,361

(22) Filed: Jul. 26, 2001

(65) Prior Publication Data
US 2002/0100442 A1 Aug. 1, 2002

(30) Foreign Application Priority Data
Jan. 31, 2001 (JP) ........................................ 2001-024265

(51) Int. Cl.[7] .................................................. F01L 1/34
(52) U.S. Cl. ................................ 123/90.17; 123/90.15; 123/90.17
(58) Field of Search ........................... 123/90.17, 90.15, 123/90.12, 90.31

(56) References Cited
U.S. PATENT DOCUMENTS 5,398,502 A * 3/1995 Watanabe ................ 123/90.15
6,152,105 A * 11/2000 Nishimura et al. ..... 123/339.11
6,196,173 B1 * 3/2001 Takahashi et al. ....... 123/90.15
6,237,327 B1 * 5/2001 Nishimura et al. ............ 60/276

FOREIGN PATENT DOCUMENTS

| JP | 6-299876 | 10/1994 |
| JP | 9-324613 | 12/1997 |
| JP | 11-210424 | 8/1999 |
| JP | 11-229914 | 8/1999 |
| JP | 11-324741 | 11/1999 |

* cited by examiner

Primary Examiner—Thomas Denion
Assistant Examiner—Jaime Corrigan
(74) Attorney, Agent, or Firm—Sughrue Mion, PLLC

(57) ABSTRACT

A valve timing control system for accelerating activation of a catalytic converter in an internal combustion engine in a cold starting operation mode while enhancing control accuracy by learning a reference position of a cam angle. The system includes actuators (15; 16) coupled to cam shafts (15C; 16C), respectively, hydraulic pressure supply means (19; 20) for driving the actuators (15; 16), and a controller (21A) for controlling hydraulic pressure fed to the actuators (15; 16) in dependence on engine operation states to change phases of the cam shafts (15C; 16C) relative to a crank shaft (13C). The controller (21A) is so designed as to set a valve timing to a most advanced position or alternatively to a most retarded position in a cold-state idling operation mode for the purpose of learning a reference position.

12 Claims, 11 Drawing Sheets

VALVE TIMING CONTROL SYSTEM FOR INTERNAL COMBUSTION ENGINE

BACKGROUND OF THE INVENTION

1. Field of the Invention

The present invention generally relates to a valve timing control apparatus or system for an internal combustion engine which system is designed for controlling operation timings of intake valves and exhaust valves of the engine in dependence on the engine operation states or modes. More particularly, the present invention is concerned with a valve timing control system for an internal combustion engine which system is designed for accelerating or promoting temperature rise of a catalytic converter disposed in an exhaust pipe of the engine in a cold-state idling operation mode while learning a reference (or standard) cam angle for preventing or suppressing occurrence of changes in the engine rotation speed (rpm) as well as engine stall event by stabilizing the engine control performance in a warm-state idling operation mode and ensuring a significant reduction of harmful components contained in the exhaust gas discharged from the engine.

2. Description of Related Art

In recent years, in the industrial field of internal combustion engines for the motor vehicles and others, the statutory regulations imposed on the emission of harmful substances or components contained in the exhaust gas discharged to the atmosphere from the engine mounted on a motor vehicle, automobile or the like become more and more severe from the standpoint of the protection of environment. Under the circumstances, there exists a great demand for reducing the emission of harmful substances or components contained in the exhaust gas discharged from the internal combustion engine.

In general, there have heretofore been adopted two sorts of methods of reducing the harmful exhaust gas components. One method is directed to reduction of the harmful gas directly discharged from the internal combustion engine (hereinafter also referred to simply as the engine). The other method is directed to the reduction of the harmful components through posttreatment of the engine exhaust gas by means of a catalytic converter (hereinafter also referred to simply as the catalyst) installed within an exhaust pipe of the engine at an intermediate location thereof.

As is well known in the art, in the catalytic converter such as mentioned above, reaction of making the harmful gas components be harmless is difficult to take place or rendered impossible unless the temperature of the catalyst has reached a predetermined level. Consequently, it is an important requirement to increase or rise speedily the temperature of the catalyst even when the internal combustion engine is, for example, in the course of starting operation in the cold state (i.e., in the state of low temperature).

In recent years, in an effort to enhance the engine output power while reducing the harmful exhaust gases and improving the fuel-cost performance, there has been developed and increasingly adopted a valve timing control system which is capable of changing or altering the valve timings for intake/exhaust valves of engine cylinders in dependence on the operating states of the engine.

In more concrete, in the conventional valve timing control system known heretofore, an actuator means is provided for changing or modifying the relative angular position (relative phase) of cam shafts relative to the crank shaft of the engine, wherein reference or standard position of the actuator means is stored by detecting the angular position of the crank shaft and the relative positions or phases of the cam shafts relative to the cam shaft to thereby control the relative position(s) or phase(s) of the cam shaft(s) in dependence on the engine operating states.

Further, a locking mechanism is provided in association with the actuator means, which mechanism is designed to operate at an intermediate or mid position between the most advanced angular position and the most retarded angular position so that the actuator means can engage with the locking mechanism upon starting of the engine operation while allowing the valve timing control to be carried out in dependence on the operating state of the engine after it has been started.

More specifically, an electronic control unit (hereinafter also referred to as the ECU in short) is provided which serves as a control means and is so designed as to detect the rotational phase or position (angular position) of the cam shaft for controlling the valve timing to thereby learn phase difference relative to the reference or standard rotational position of the cam shaft while regulating mechanically the tendency of the rotational phase to vary.

The valve timing control system mentioned above includes a variable valve timing mechanism (also referred to as the VVT mechanism in short) which is comprised of a vane disposed rotatably within a housing for changing the phase or angular position of the cam shaft which drives the intake valve or the exhaust valve. In this conjunction, description concerning the vane arrangement will be made in detail later on.

At this juncture, it should however be mentioned that in the engine starting operation mode, the vane of the variable valve timing mechanism is held substantially at a mid position (start corresponding position) for regulating the relative rotation or angular displacement of the cam shaft relative to the crank shaft and releasing the regulation upon lapse of a predetermined time after the start of engine operation.

The valve timing control system of this type is disclosed, for example, in Japanese Patent Application Laid-open Publication No. 324613/1997 (JP-A-9-324613).

For having better understanding of the concept underlying the present invention, description will first be made in some detail of a hitherto known or conventional valve timing control system for an internal combustion engine. FIG. 6 is a functional block diagram showing generally and schematically a configuration of a conventional valve timing control system for an internal combustion engine disclosed in the above-mentioned publication together with several peripheral constituent parts of the engine.

Referring to FIG. 6, the intake air taken in through an intake pipe 4 is charged into a combustion chamber(s) defined within the cylinder(s) of the engine 1 by way of an air cleaner 2. An air-flow sensor 3 is disposed in the intake pipe 4 at a position downstream of the air cleaner 2.

The air cleaner 2 is designed to purify the intake air fed into the combustion chamber(s) defined within the engine cylinder(s). The air flow sensor 3 is designed to measure the quantity or flow rate of the intake air.

Further, installed in the intake pipe 4 are a throttle valve 5, an idle speed control valve (also referred to simply as the ISCV in short) 6 and a fuel injector 7.

The throttle valve 5 is designed to adjust or regulate the intake air quantity (i.e., the amount or flow rate of the intake air) flowing through the intake pipe 4 for thereby controlling the output power or torque of the engine 1. The idle speed control valve 6 is designed to adjust or regulate the intake air flow which bypasses the throttle valve 5 to thereby effectuate the control of the engine rotation speed (rpm) in the idle operation state. Further, the fuel injector 7 is designed to inject into the intake pipe 4 an amount of fuel which conforms to the flow rate of the intake air.

Additionally, provided internally of the combustion chamber of the engine cylinder 1 is a spark plug 8 designed to produce a spark discharge for triggering combustion of the air-fuel mixture charged in the combustion chamber defined within the cylinder. The spark plug 8 is electrically connected to an ignition coil 9 which supplies electric power of high voltage to the spark plug 8.

An exhaust pipe 10 is provided for discharging an exhaust gas which results from the combustion of the air-fuel mixture within the engine cylinder. An $O_2$-sensor 11 and a catalytic converter 12 are disposed in the exhaust pipe 10. The $O_2$-sensor 11 serves for detecting the content of residual oxygen contained in the exhaust gas.

The catalytic converter (or catalyst) 12 is constituted by a three-way catalytic converter known by itself and serves for eliminating simultaneously harmful gas components such as HC (hydrocarbon), CO (carbon monoxide) and $NO_x$ (nitrogen oxides) contained in the exhaust gas.

A sensor plate 13 designed for detecting the crank angle is mounted on a crank shaft (not shown) of the engine so as to corotate therewith. The sensor plate 13 is provided with a projection (not shown) at a predetermined crank angle in the outer periphery of the plate.

A crank angle sensor 14 is installed at a position diametrically opposite to the outer periphery of the sensor plate 13 for detecting the angular position of the crank shaft in cooperation with the sensor plate 13. Thus, the crank angle sensor 14 can generate an electric signal indicative of the crank angle (i.e., the pulse-like crank angle signal) every time the projection of the sensor plate 13 passes by the crank angle sensor 14. In this way, the rotational position or angular position (i.e., crank angle) of the crank shaft can be detected.

The engine 1 is equipped with intake and exhaust valves. The timing at which the intake pipe 4 and the exhaust pipe 10 are put into mutual communication are determined by the intake and exhaust valves. On the other hand, the timings for driving the intake and exhaust valves are determined by the cam shafts which rotate at a speed equal to a half of that of the crank shaft. This will be described later on.

Actuators 15 and 16 are provided for the purpose of changing adjustably the cam phases. In other words, the timings for driving or actuating the intake and exhaust valves are individually changed by these actuators 15 and 16, respectively.

In more concrete, each of the actuators 15 and 16 is comprised of a retarding hydraulic chamber and an advancing hydraulic chamber partitioned from each other, as will be described later on, for changing the rotational or angular positions (phases) of the cam shafts 15C and 16C, respectively, relative to the crank shaft.

Cam angle sensors 17 and 18 are disposed at positions diametrically opposite to the outer periphery of cam angle detecting sensor plates (not shown) with the aim of detecting the angular positions of the cams (i.e., cam angles or phases) in cooperation with the associated sensor plates. More specifically, each of the cam angle sensors 17 and 18 is designed to generate a pulse signal indicative of the cam angle (i.e., the cam angle signal) in response to a projection formed in the outer periphery of the associated cam angle detecting sensor plate in a similar manner as the crank angle sensor 14 described previously. In this way, it is possible to detect the cam angles (or cam phases) and hence the angular positions of the cam shafts.

Oil control valves (also referred to as the OCV in short) 19 and 20 constitute hydraulic pressure supply units in cooperation with oil pumps (not shown) and serve for controlling or regulating the hydraulic pressure supplied to the individual actuators 15 and 16 for controlling the cam phases. Incidentally, the oil pump is designed to feed oil at a predetermined hydraulic pressure.

An electronic control unit (also referred to simply as the ECU) 21 which may be constituted by a microcomputer or microprocessor serves as a control means for performing overall control of the internal combustion engine system. Thus, the ECU 21 is in charge of controlling the fuel injectors 7 and the spark plugs 8 as well as the angular positions or rotational phases of the cam shafts 15C and 16C in dependence on the engine operating states detected by the various sensors such as the air-flow sensor 3, the $O_2$-sensor 11, the crank angle sensor 14 and the cam angle sensors 17 and 18.

Further provided in association with the throttle valve 5 is a throttle position sensor (not shown in the figure) for detecting the throttle opening degree. Furthermore, a water temperature sensor is provided for detecting the temperature of engine cooling water. The throttle opening degree and the cooling water temperature as detected are also supplied to the ECU 21 as the information indicative of the operating state of the engine 1 similarly to the various sensor information mentioned above.

Next, description will be made of the conventional engine control operation performed by the prior art valve timing control system shown in FIG. 6. In the first place, the air flow sensor 3 measures the air quantity (flow rate of the intake air) fed to the engine 1, the output of the air-flow sensor 3 being supplied to the ECU 21 as one of the detection information indicative of the operating state of the engine.

The electronic control unit or ECU 21 arithmetically determines the fuel injection quantity which conforms to the air quantity as measured to thereby drive or actuate correspondingly the fuel injector 7. At the same time, the ECU 21 controls the time duration of electrical energization of the ignition coil 18 as well as the timing for interruption thereof to thereby cause the spark plug 8 to produce a spark discharge for igniting or firing the air-fuel mixture charged within the combustion chamber defined within the engine cylinder at a proper timing.

On the other hand, the throttle valve 5 serves for adjusting or regulating the amount of intake air fed to the engine with the aim of controlling correspondingly the output torque or power generated by the engine 1. The exhaust gas resulting from the combustion of the air-fuel mixture within the cylinder of the engine 1 is discharged through the exhaust pipe 10.

In that case, the catalytic converter 12 disposed within the exhaust pipe 10 at an intermediate location thereof converts the harmful components contained in the exhaust gas such as hydrocarbon (HC) (unburned gas), carbon monoxide (CO) and nitrogen oxides ($NO_x$) into harmless carbon dioxide and water ($H_2O$). In this manner, the engine exhaust gas is purified to be subsequently discharged to the atmosphere.

In order to make available a maximum purification efficiency of the three-way catalytic converter 12, the $O_2$-sensor 11 is installed in association with the exhaust pipe 10 for detecting the amount of residual oxygen contained in the exhaust gas. The output signal of the $O_2$-sensor 11 is inputted to the electronic control unit or ECU 21 which responds thereto by regulating through a feedback loop the amount of fuel injected by the fuel injector 7 so that the air-fuel mixture which is to undergo combustion can assume the stoichiometric ratio.

In addition, the ECU 21 controls the actuators 15 and 16 (which constitute parts of the variable valve timing mechanism) in dependence on the engine operating state for regulating variably or adjustably the timings at which the intake and exhaust valves are to be driven or actuated.

In the following, by reference to FIGS. 7 to 14, description will be made in concrete of the phase angle control operation preformed for the cam shafts 15C and 16C by the conventional valve timing control system of the internal combustion engine.

By the way, it should be mentioned that in the case of the conventional internal combustion engine of the fixed valve timing type (not shown), torque of the crank shaft is transmitted to the cam shafts through the medium of the timing belts (timing chains) and transmission mechanisms including pulleys and sprockets coupled operatively to the cam shafts which corotate with the respective pulleys.

By contrast, in the case of the internal combustion engine equipped with the variable valve timing mechanism shown in FIG. 6, there are provided in place of the pulleys and the sprockets mentioned above the actuators 15 and 16 which are designed to change the relative phase positions between the cam shafts and the crank shaft.

FIG. 7 is a view for illustrating relations between the crank angle [CA] and the valve lift stroke [mm] Ad indicating the degree of valve opening (hereinafter also referred to as the valve opening degree). In the figure, the top dead center in the compression stroke of the cylinder is designated by reference symbol TDC.

In FIG. 7, a single-dotted broken line curve represents change of the valve lift stroke when the valve operation timing is shifted to a most retarded position delimited mechanically, a broken line curve represents change of the valve lift stroke when the valve operation timing is shifted to a most advanced position delimited mechanically, and a solid line curve represents change of the valve lift stroke in a lock-up state where the valve operation timing is neither retarded nor advanced, being locked by a locking mechanism which will be described hereinafter.

Referring to FIG. 7, it is to be noted that the peak position of the valve lift stroke on the retard side (right-hand side as viewed in the figure) with reference to the top dead center (TDC) corresponds to the fully opened position of the intake valve while the peak position of the valve lift stroke on the advance side (left-hand side as viewed in the figure) corresponds to the fully opened position of the exhaust valve.

Accordingly, difference in the crank angle between the peaks on the retard side and the advance side (i.e., difference between the single-dotted line curve and the broken line curve) represents the range within which the valve operation timing can be changed (i.e., the valve operation timing variable range). To say in another way, the valve operation timing or valve timing in short can be changed or varied within the crank angle range defined between the broken line curve and the single-dotted line curve in each of the suction and exhaust operations, respectively.

FIG. 8 is a timing chart for illustrating timing or phase relations between the output pulse signal of the crank angle sensor 14 on one hand and that of the cam angle sensor 17 or 18 on the other hand. More specifically, shown in FIG. 8 are the output pulse signals of the cam angle sensor 17 or 18 when the valve timing is most retarded and when the valve timing is most advanced, respectively, relative to the output pulse signal of the crank angle sensor 14.

In this conjunction, it should be added that the phase position of the output signal of the cam angle sensor 17 or 18 relative to the output pulse signal of the crank angle sensor 14 (i.e., crank angle position) becomes different in dependence on the positions at which the cam angle sensor 17; 18 is mounted.

At this juncture, it should further be mentioned that retarding of the valve timing (valve operation timing) means that the valve opening start timings of both the intake and exhaust valves are retarded or delayed relative to (or with reference to) the crank angle, while advancing of the valve timing means that the valve opening start timings of both the intake and exhaust valves are advanced relative to the crank angle.

The opening start timings for the intake valve and the exhaust valves can be changed or modified by means of the actuators 15 and 16 which constitute parts of the variable valve timing mechanism to be thereby so controlled as to assume a given retarded position or advanced position within the valve timing adjustable or variable range mentioned previously by reference to FIG. 7.

FIGS. 9 to 11 are perspective views showing schematically an internal structure of the actuators 15 and 16 which can be implemented substantially identical with each other. More specifically, FIG. 9 shows the actuator (15; 16) in a state where the cam phase is adjusted to the most retarded position (corresponding to the state indicated by the single-dotted line curve in FIG. 7), FIG. 10 shows the actuator in the state where the cam phase is adjusted to the locked or lock-up position (corresponding to the state indicated by the solid line curve in FIG. 7), and FIG. 11 shows the actuator in the state where the cam phase is adjusted to the most advanced position (corresponding to the state indicated by the broken line curve in FIG. 7), respectively.

Referring to FIGS. 9, 10 and 11, each of the actuators 15 and 16 is comprised of a housing 151 which is rotatable in the direction indicated by an arrow, a vane assembly 152 which can rotate together with the housing 151, retarding hydraulic chambers 153 and advancing hydraulic chambers 154 both defined internally of the housing 151, a lock pin 155 and a spring 156 which are provided within the housing 151, and a locking recess 157 formed in the vane assembly 152.

Power or torque is transmitted to the housing 151 from the crank shaft through the medium of a belt/pulley transmission (not shown) with the rotation speed being reduced by a factor of 1/2.

The position (phase position) of the vane assembly 152 is caused to shift within the housing 151 in response to the hydraulic pressure supplied selectively to the retarding hydraulic chamber 153 or the advancing hydraulic chamber 154.

The range of operation (hereinafter also referred to as the operation range) of the vane assembly 152 is determined or delimitated by the retarding hydraulic chamber 153 and the advancing hydraulic chamber 154.

The spring 156 resiliently urges the lock pin 155 in the protruding direction while the locking recess 157 is formed at a predetermined vane lock-up position so that the recess 157 faces in opposition to the tip end of the lock pin 155.

Parenthetically, an oil feed port (not shown) is formed in the locking recess 157 through which the hydraulic medium (i.e., oil in this case) is supplied interchangeably from either one of the retarding hydraulic chamber 153 and the advancing hydraulic chamber 154 within which a higher hydraulic pressure prevails.

The vane assembly 152 adapted to be operated within the retarding hydraulic chamber 153 and the advancing hydraulic chamber 154 (i.e., operation range of the vane) and shifted in respect to the angular position or phase thereof is operatively coupled to each of the cam shafts 15C and 16C which are designed to drive the intake and exhaust valves, respectively, of the engine cylinder.

Although not shown in the drawings, the actuator 16 for the exhaust valve driving cam shaft is provided with a spring for resiliently urging the vane assembly 152 so that it can assume the advanced position against the reaction force exerted by the cam shaft 16C.

The actuators 15 and 16 are driven under the hydraulic pressure of a lubricant oil of the engine 1 supplied through the oil control valves 19 and 20. For controlling the cam angle phases of the actuators 15 and 16 in such manner as described above by reference to FIGS. 9 to 11, control is performed for the amount of oil (i.e., hydraulic pressure) fed to the actuators 15 and 16.

By way of example, regulation of the cam angle phase to the most retarded position, as illustrated in FIG. 9, can be realized by feeding oil into the retarding hydraulic chamber 153. On the contrary, regulation of the cam angle phase to the most advanced position, as illustrated in FIG. 11, can be effectuated by feeding lubricant oil into the advancing hydraulic chamber 154.

The oil control valves 19 and 20 are in charge of selecting either the retarding hydraulic chamber 153 or the advancing hydraulic chamber 154 for the oil supply. FIGS. 12, 13 and 14 show schematically in side-elevational sectional views the internal structure of the oil control valves 19 and 20 which can be implemented in a substantially identical structure.

Referring to FIGS. 12 to 14, each of the oil control valves 19 and 20 is comprised of a cylindrical housing 191, a spool 192 slideably disposed within the housing 191, a solenoid coil 193 for driving slideably moving continuously the spool 192 and a compression spring (return spring) 194 for resiliently urging the spool 192 in the restoring direction.

The housing 191 is provided with an orifice 195 which is hydraulically communicated to a pump (not shown), orifices 196 and 197 hydraulically connected to the actuator 15 or 16, and drain orifices 198 and 199 which are fluidly communicated to an oil pan.

The orifice 196 can be communicated to the retarding hydraulic chamber 153 of the actuator 15 or alteratively to the advancing hydraulic chamber 154 of the actuator 16. On the other hand, the orifice 197 can be hydraulically communicated to the advancing hydraulic chamber 154 of the actuator 15 or alternatively to the retarding hydraulic chamber 153 of the actuator 16.

The orifices 196 and 197 are selectively put into hydraulic communication with the oil feeding orifice 195 in dependence on the axial position of the spool 192 (i.e., the position of the spool in the longitudinal direction thereof). In the state shown in FIG. 12, the orifice 195 is shown as being communicated to the orifice 196, while in FIG. 14, the orifice 195 is shown as being communicated to the orifice 197.

Similarly, the drain orifices 198 and 199 are selectively put into communication with the orifice 197 or 196 in dependence on the axial position of the spool 192. In the state shown in FIG. 12, the orifice 197 is shown as being communicated to the orifice 198, while in FIG. 14, the orifice 196 is being communicated to the orifice 199.

The oil feed port (not shown) formed in the locking recess 157 is so arranged as to be supplied with oil when the associated oil control valve 19; 20 is in the electrically driven state (i.e., the state shown in FIG. 14). More specifically, when the hydraulic pressure applied to the locking recess 157 overcomes the spring force of the spring 156, the lock pin 155 is pushed out from the locking recess 157, whereby the locked state is cleared.

FIG. 12 shows the state in which the electric current flowing through the solenoid or coil 193 is at a minimum value and thus the spring 194 is stretched or relaxed to a maximum extent.

Assuming that the oil control valve shown in FIG. 12 serves as the oil control valve 19 on the intake valve side, the hydraulic medium or oil supplied from the pump via the orifice 195 flows into the retarding hydraulic chamber 153 of the actuator 15, as a result of which the actuators 15 is moved to the state illustrated in FIG. 9.

Consequently, the oil resident in the advancing hydraulic chamber 154 of the actuator 15 is forced to flow out through the orifice 197 to be finally discharged to the oil pan by way of the orifice 198.

On the other hand, assuming that the oil control valve shown in FIG. 12 serves as the oil control valve 20 on the exhaust valve side, the situation is reversed. Namely, the hydraulic medium or oil supplied from the pump via the orifice 196 flows into the advancing hydraulic chamber 154 of the actuator 16, as a result of which the actuators 16 is ultimately set to the state illustrated in FIG. 11.

In that case, the oil contained in the retarding hydraulic chamber 153 of the actuator 16 is forcibly discharged to the oil pan by way of the orifices 197 and 198.

By virtue of the hydraulic circuit arrangement (oil flow path arrangement) described above by reference to FIG. 12, valve overlap between the intake and exhaust valves can be suppressed to a minimum even if there occurs failure such as shutdown of electric current supply to either one of the oil control valves 19 and 20 disposed on the intake valve side and the exhaust valve side, respectively, due to wire breakage or the like default. This feature is advantageous from the viewpoint of ensuring a high withstandability against occurrence of the engine stall event.

Illustrated in FIG. 14 is the state in which the energizing current flowing through the coil 193 is of a maximum value and thus the spring 194 is compressed to the minimum length.

Assuming, by way of example, that the oil control valve shown in FIG. 14 serves as the oil control valve 19 on the intake valve side, the oil fed from the pump is caused to flow into the advancing hydraulic chamber 154 of the actuator 15 via the orifice 197, whereas the oil in the retarding hydraulic chamber 153 of the actuator 15 is discharged via the orifices 196 and 199.

On the other hand, in the case where the oil control valve shown in FIG. 14 serves as the oil control valve 20 on the exhaust valve side, the oil fed from the pump is forced to flow into the retarding hydraulic chamber 153 of the actuator 16 via the orifice 197, while the oil in the advancing hydraulic chamber 154 of the actuator 16 is drained via the orifices 196 and 199.

FIG. 13 shows the state corresponding to the valve timing control end position or lock-up position (intermediate or mid position). In this state, the vane assembly 152 of the actuator 15; 16 is at a given desired position or in the state illustrated in FIG. 10.

In the state illustrated in FIG. 13, the orifice 195 provided on the oil supply side is not directly communicated to the orifice 196 or 197 disposed on the actuator side. However, due to oil leakage, it is possible to supply the oil to the oil feed port of the locking recess 157 (see FIG. 10).

Accordingly, even when the vane assembly 152 is at the lock-up position, there can arise such situation in which the hydraulic pressure applied to the oil feed port under the oil leakage overcomes the spring force of the spring 156 (i.e., exceeds the predetermined unlocking hydraulic pressure value). In that case, the lock pin 155 is caused to disengage from the locking recess 157, allowing the vane assembly 152 to move or operate within the housing 151.

At this juncture, it should be mentioned that the predetermined unlocking hydraulic pressure mentioned above may be set at a necessary minimum level by adjusting the spring force of the spring 156 or by resorting to any other appropriate means.

Furthermore, the positions (phases) of the vane assembly 152 of the actuators 15 and 16 which play the crucial role in determining the valve operation timings can appropriately be controlled by detecting the vane positions by means of the cam angle sensors 17 and 18.

The cam angle sensors 17 and 18 are mounted at the positions at which these sensors are capable of detecting the relative position between the crank shaft on one hand and the cam shafts 15C and 16C on the other hand.

Referring to FIG. 8, the phase difference or deviation relative to the output signal of the crank angle sensor when the valve operation timing is at the most advanced position (see the broken line curve shown in FIG. 7) is indicated by A, whereas the phase difference or deviation relative to the output signal of the crank angle sensor when the valve timing is at the most retarded position (see the single-dotted line curve shown in FIG. 7) is indicated by B.

The ECU 21 is so designed or programmed as to perform the feedback control such that the phase differences A and B as detected coincide with respective desired value, whereby the valve timing control can be carried out at a given position.

More specifically, it is assumed, by way of example only, that on the intake valve side, the detected position of the cam angle sensor 17 relative to the detection timing of the crank angle sensor 14 is retarded with reference to the desired position arithmetically determined by the ECU 21. In that case, the detected position (detection timing) of the cam angle sensor 17 has to be to advanced to the desired position. To this end, the amount of the electric current flowing through the solenoid or coil 193 of the oil control valve 19 is regulated correspondingly in dependence on the difference between the detected position and the desired position, to thereby control the spool 192.

Further, in the case where the phase difference between the desired position and the detected position is large, the amount of the electric current supplied to the coil 193 of the oil control valve 19 is increased in order to allow the desired position to be followed or attained speedily by the detected position.

As a result of this, the aperture of the orifice 197 opened into the advancing hydraulic chamber 154 of the actuator 15 is increased, which results in increasing of the amount of oil fed to the advancing hydraulic chamber 154.

Subsequently, as the detected position approaches to the desired position, the current supply to the coil 193 of the oil control valve 19 is decreased so that the position of the spool 192 of the oil control valve 19 becomes closer to the position illustrated in FIG. 13.

At the time point when coincidence is found between the detected position and the desired position, the electric current supply to the coil 193 is so controlled that the oil flow paths leading to the retarding hydraulic chamber 153 and the advancing hydraulic chamber 154 of the actuator 15 are LAW intercepted, as is shown in FIG. 13.

Incidentally, the desired position in the ordinary engine operation mode (e.g. running state succeeding to the warm-up operation) can be so set or established that optimal valve timing can be realized in dependence on the engine operation states by storing in advance, for example, two-dimensional map data values obtained experimentarily in correspondence to the engine operation states (e.g. engine rotation speeds (rpm) and-engine loads) in a read-only memory or ROM incorporated in the ECU 21.

On the other hand, in the engine starting mode, the rotation speed of the oil pump which is driven by the engine 1 is not sufficiently high. Consequently, the amount of the oil fed to the actuator 15 is also insufficient. Thus, the control of the valve operation timing toward the advanced position by controlling the hydraulic pressure as described above is rendered practically impossible.

Such being the circumstances, jolting or fluttering of the vane assembly 152 due to shortage of the hydraulic pressure is prevented by engaging the lock pin 155 with the locking recess 157, as shown in FIG. 10.

In that case, if the intake valve is actuated with an excessively large retard (i.e., if the valve operation timing is overretarded), the actual compression ratio becomes lowered while excessive advancing of actuation of the intake valve (i.e., overadvancing of the valve timing) will result in increasing of the time period during which the intake valve and the exhaust valve overlap with each other. In other words, overretarded or overadvanced actuation of the intake valve results in increasing of the pumping loss.

Certainly, the overretarded or overadvanced actuation control of the intake valve can profitably be adopted for increasing the rotation speed in the engine starting operation (e.g. upon cranking) and triggering the initial explosion. However, because the combustion is essentially inadequate, complete combustion or explosion is difficult to realize, which will ultimately lead to degradation of the starting performance of the engine.

On the other hand, overretarding of actuation of the exhaust valve will result in increasing of the overlap period during which the intake valve and the exhaust valve overlap with each other, similarly to the case where operation of the intake valve is advanced excessively. By contrast, overadvancing of the exhaust valve actuation will incur lowering of the actual expansion ratio, rendering it impossible to transmit effectively and sufficiently the combustion energy to the crank shaft.

As is apparent from the above, overretarded or overadvanced control of the valve operation or actuation timings in the engine starting operation or immediately thereafter may unwantedly incur degradation of the engine starting performance or incapability of starting the engine operation in the worst case.

Thus, for coping with the problems encountered in the engine starting operation, as described above, the vane assembly 152 is fixedly set at the lock-up position (i.e., nearly mid position between the most retarded position and the most advanced position) by engaging the lock pin 155 into the locking recess 157, as shown in FIG. 10.

In that case, since the hydraulic pressure of the lubricating oil increases as the engine rotation speed (rpm) increases in succession to the engine starting operation, the hydraulic pressure is fed to the actuators 15 and 16 because of the oil leakage described previously even in the state where the spool 192 is at the position shown in FIG. 13.

Consequently, when the hydraulic pressure applied to the locking recess 157 overcomes the spring force of the spring 156, the lock pin 155 is caused to disengage from the locking recess 157, allowing the vane assembly 152 to move rotationally.

Thus, by controlling the oil control valves 19 and 20 after unlocking of the vanes, the hydraulic pressure fed to the retarding hydraulic chamber 153 and the advancing hydraulic chamber 154 can be regulated, whereby the valve timing retarding or advancing control can be carried out.

In that case, in the high-speed rotation range of the engine 1 among others, the valve operation or actuation timing is so controlled as to be retarded much more when compared with the engine starting operation, for the purpose of realizing the suction inertia effect as well as enhancement of the volumetric efficiency and hence the output performance of the engine.

As can be appreciated from the foregoing, in the engine starting operation, the lock pins 155 of the actuators 15 and 16 are locked at an approximately mid position between the most retarded position and the most advanced position with a view to enhancing the engine starting performance. On the other hand, once the engine operation has been started after releasing of the locking mechanism, the valve operation timing is so controlled as to be retarded especially in the high-speed rotation range of the engine for thereby enhancing the engine output performance.

Next, by referring to FIG. 15, description will be directed to a learn processing operation of the reference (standard) position in a conventional valve timing control system for an internal combustion engine, which system is disclosed, for example, in Japanese Patent Application Laid-Open Publication No. 229914/1999 (JP-A-11-229914).

FIG. 15 is a flow chart for illustrating operation of the conventional valve timing control system of the internal combustion engine disclosed in the abovementioned publication.

Referring to FIG. 15, it is decided in a step S101 whether or not the engine 1 is rotating. When decision is made in the step S101 that the engine 1 is not rotating (when the decision step S101 results in negation "No"), the processing routine shown in FIG. 15 comes to an end without executing the processing steps which succeed to the step S101.

On the other hand, when decision is made in the step S101 that the engine 1 is rotating (when the decision step S101 results in affirmation "Yes"), decision is then made as to whether or not engine rotation speed (rpm) Ne is equal to or greater than a predetermined rotation speed (rpm) Neo (step S102).

When it is decided in the step S102 that the engine rotation speed (rpm) Ne is smaller than the predetermined rotation speed (rpm) Neo (i.e., when the decision step S102 results in "No"), the processing routine shown in FIG. 15 is terminated. By contrast, when the engine rotation speed (rpm) Ne is equal to or greater than the predetermined rotation speed (rpm) Neo (i.e., when the decision step S102 results in "Yes"), it is then decided in a step S103 whether or not cooling water temperature Tw of the engine 1 is equal to or higher than a predetermined temperature Two indicative of the warm-up operation.

When it is found in the step S103 that the cooling water temperature Tw is lower than the predetermined temperature Two, indicating that the engine 1 is in the cold state (i.e., when the decision step S103 results in "No"), the processing routine shown in FIG. 15 is terminated.

On the other hand, when decision is made that the cooling water temperature Tw is equal to or higher than the predetermined temperature Two (i.e., when the decision step S103 results in "Yes"), the valve timing is so controlled as to be set to a stop position where magnitude of the valve overlap is at a minimum (step S104).

In succession, decision is made in a step S105 as to whether or not a predetermined time to has lapsed. When it is decided in the step S105 that the predetermined time to has not lapsed yet (i.e., when the decision step Sl05 results in negation "No"), the processing routine shown in FIG. 15 is terminated.

By contrast, when it is decided in the step S105 that the predetermined time to has lapsed (i.e., when the decision step S105 results in affirmation "Yes"), a rotational phase difference DA1 between the crank shaft and the cam shaft is arithmetically determined (step S106), whereon a value resulting from subtraction of a reference rotational phase difference Dao from the rotational phase difference DA1 is determined as a deviation or difference DDA (step S107).

Finally, the deviation or difference DDA is stored in a memory as a learned value (step S108), whereon the processing routine shown in FIG. 15 comes to an end.

Through the processings described above, the valve timing of the intake valve can be so controlled as to be set or shifted to the most retarded position with the valve timing of the exhaust valve being so controlled as to be shifted to the most advanced position in the warm-up idling operation mode of the engine 1, whereby the magnitude of the valve overlap between both the intake and exhaust valves and hence the amount of gas flowing intactly through the engine cylinder can be reduced to a minimum, as a result of which controllability in the warmup idling operation mode can be enhanced.

In this case, the most retarded. position and the most advanced position for the intake valve and the exhaust valve, respectively, are set as the learned values in the warm-up idling operation mode. Thus, the reference position can be learned within an ordinary cam position control range without need for changing the cam angle.

Parenthetically, in the control system in which the valve timing is held at a nearly mid position between the most retarded position and the most advanced position in the engine starting operation mode, as described in Japanese Patent Application Laid-Open Publication No. 314613/1997 (JP-A-9-324613) mentioned hereinbefore, the cam angle must be changed with a view to learning a reference position which differs from that for the ordinary control. Accordingly, the reference position learn processing described above by reference to FIG. 15 can not be adopted.

Furthermore, in order to learn the reference (or standard) position of the cam angle, there arises the necessity for setting the cam angles (the most retarded position and the most advanced position) which differs from those for the ordinary operation control, which will undesirably exert adverse influence to the engine performance, incurring variation in the engine rotation speed or the like unfavorable events, to a disadvantage.

Furthermore, in the conventional valve timing control systems for the internal combustion engine described above, no consideration has been paid to such technical matters as improvement of the exhaust gas quality and acceleration of the temperature rise of the catalytic converter.

As will now be understood from the foregoing description, in the conventional valve timing control systems for the internal combustion engine such as the system disclosed in Japanese Patent Application Laid-Open Publication No. 324613/1997 (JP-A-9-324613) mentioned previously in which the cam angle is held approximately at the mid position in the engine starting operation, the cam angle(s) which differs from that for the ordinary operation must be set in order to learn the reference position, giving rise to a problem that the engine rotation speed is subjected to variation, exerting adverse influence to the engine operation performance.

In this conjunction, it is conceivable that the learn processing disclosed in Japanese Patent Application Laid-Open Publication No. 229914/1999 (JP-A-11-229914) is applied to the valve timing control system disclosed in Japanese Patent Application Laid-Open Publication No. 314613/1997 (JP-A-9-324613). In that case, the cam angle different from that for the ordinary operation has to be set for learning the reference position, which will however exert adverse influence to the engine performance. Such being the circumstances, not a little difficulty will be encountered in applying the known learn processing mentioned above to the conventional valve timing control system.

SUMMARY OF THE INVENTION

In the light of the state of the art described above, it is a primary object of the present invention to provide a valve timing control system for an internal combustion engine, which system is effectively capable of stabilizing idling operation control performance in the warmed-up engine state while ensuring significant reduction of harmful exhaust gas components contained in the exhaust gas discharged from the engine by promoting the temperature rise of the catalyst and suppressing occurrence of variation or fluctuation in the engine rotation speed (rpm) and engine stall event by learning the reference position of the cam angle by shifting the valve operation timing to the most advanced position (or to the most retarded position) during the cold state idling operation.

Another object of the present invention is to provide a valve timing control system for an internal combustion engine, which system is capable of preventing or suppressing occurrence of variation or fluctuation in the engine rotation speed and engine stall event while realizing significant reduction of harmful exhaust gas components in the warmed-up engine state by stabilizing the idling operation control performance by learning the reference position in the warmed-up engine state unless the reference position has been learned in the course of the engine warm-up operation.

Yet another object of the present invention is to provide a valve timing control system for an internal combustion engine, which system can ensure stabilization of the idling operation control performance in the warmed-up engine state by setting the cam angle to a mid or intermediate position between the most advanced position and the most retarded position in case the reference position has already been learned in the course of the engine warm-up operation.

Still another object of the present invention is to provide a valve timing control system for an internal combustion engine, which system is capable of preventing or suppressing occurrence of variation in the engine rotation speed and engine stall event while ensuring reduction of harmful exhaust gas components and regulating adjustably the ignition timing and the fuel injection quantity by learning the reference position when it has not yet been learned in the course of engine warm-up operation.

In view of the above and other objects which will become apparent as the description proceeds, there is provided according to a general aspect of the present invention a valve timing control system for an internal combustion engine, which system includes a sensor means for detecting operating states of an internal combustion engine, an intake valve driving cam shaft and an exhaust valve driving cam shaft for driving intake and exhaust valves, respectively, of the internal combustion engine in synchronism with rotation of a crank shaft of the engine, an actuator means operatively connected to at least one of the intake valve driving cam shaft and the exhaust valve driving cam shaft, a hydraulic pressure supply means for feeding a hydraulic pressure to drive the actuator means, a control means for controlling the hydraulic pressure fed from the hydraulic pressure supply means to the actuator means in dependence on the operating states of the internal combustion engine to thereby change a relative phase of the cam shaft relative to the crank shaft, a crank angle sensor for detecting a rotational position of the crank shaft, and cam angle sensors for detecting rotational positions of the intake valve driving cam shaft and the exhaust valve driving cam shaft, respectively. The actuator means is comprised of a retarding hydraulic chamber and an advancing hydraulic chamber for setting a variable range within which the relative phase of the cam shaft can be changed, a locking mechanism for setting the relative phase to a lock-up position within the variable range, and an unlocking mechanism for releasing the locking mechanism in response to a predetermined level of the hydraulic pressure fed from the hydraulic pressure supply means. The control means is designed for driving the locking mechanism to thereby set the relative phase to the lock-up position when the internal combustion engine is detected as being in a starting operation state, while when the internal combustion engine is in a state which succeeds to the starting operation state, the locking mechanism is released by means of the unlocking mechanism with the hydraulic pressure fed from the hydraulic pressure supply means to the retarding hydraulic chamber and the advancing hydraulic chamber being controlled for thereby effectuating a retarding control of the relative phase or alternatively an advancing control thereof, wherein when it is detected that the engine is operating in a cold-state idling operation mode, the relative phase is so controlled as to be set to a most advanced position or alternatively to a most retarded position, and wherein a relative phase difference between a detection value of the crank angle sensor and a detection value of the cam angle sensor at the most advanced position or alternatively at the most retarded position is learned to be stored as a reference position.

By virtue of the arrangement of the valve timing control system described above, occurrence of changes in the revolution speed or number (rpm) and engine stall event can effectively be prevented or suppressed because the idling operation control performance in the warmed-up engine state can be stabilized while ensuring a significant reduction of harmful exhaust gas components discharged from the engine.

In a preferred mode for carrying out the present invention, the control means may be so designed as to set a direction in which the cam shaft is controlled such that temperature of exhaust gas of the engine rises, when the engine is in the cold-state idling operation mode.

Owing to the feature described above, reduction of the harmful exhaust gas components can positively be realized with enhanced reliability.

In another mode for carrying out the present invention, the control means may preferably be so designed or programmed that when it is detected that the reference position has not been learned yet when the engine is in a warm-up state, the control means performs control so as to set the relative phase of the cam shaft to the most advanced position or alternatively to the most retarded position for learning for storage the relative phase difference between the detection value of the crank angle sensor and the detection value of the cam angle sensor as the reference position.

With the arrangement of the valve timing control system described above, even in the case where the reference position has not been learned yet after the engine warm-up operation, the reference position can be learned.

In yet another preferred mode for carrying out the present invention, the control means may be so designed that a direction in which the cam shaft is controlled or shifted upon learning for storage of the reference position in the warm-up state is substantially same as the control direction in the cold-state idling operation mode.

With the arrangement of the valve timing control system mentioned above, the idling operation control performance can positively be stabilized.

In still another preferred mode for carrying out the present invention, the control means may be so designed as to modify control of the internal combustion engine upon learning of the reference position in the warm-up state.

With the arrangement of the valve timing control system described above, variation in the rotation of the engine can positively be suppressed with engine stall event being successfully prevented.

In a further preferred mode for carrying out the present invention, the control means may be so designed as to control at least one of a fuel injection quantity, an ignition timing and opening degrees of an idle speed control valve and a throttle valve upon learning for storage of the reference position in the warm-up state to thereby regulate an output torque of the internal combustion engine so that the operating state of the engine becomes substantially same as the state prevailed before the control for learning for storage of the reference position was performed.

With the arrangement of the valve timing control system described above, the variation of the engine rotation speed can positively be suppressed with the engine stall event being avoided.

In a yet further mode for carrying out the present invention, the control means should preferably be designed such that at a time point when the relative phase of the cam shaft is controlled in a direction toward the most retarded position or alternatively toward the most advanced position so that overlap of operation between the intake valve and the exhaust valve is decreased in the course of an ordinary control of the relative phase of the cam shaft, the detection value of the cam angle sensor is learned to be stored as a second reference position.

With the arrangement of the valve timing control system described above, the engine operation control performance in the idling mode can be stabilized without involving any appreciable complexity in the control-relevant arithmetic operation.

In a still further preferred mode for carrying out the present invention, the control means may be so designed that in the case where the control direction is set toward the most advanced position upon learning of the reference position for storage, the most retarded position taken by the intake valve during the ordinary valve timing control is learned as the second reference position to be stored.

Owing to the feature described above, there can be realized the valve timing control system for the internal combustion engine in which controllability of the engine operation in the idling mode can be stabilized without incurring complexity in the control-related arithmetic operation complex.

In another preferred mode for carrying out the present invention, the control means may be so designed as to make use of the second reference position and the reference position learned and stored during the cold-state idling operation mode for performing arithmetic operation for controlling the valve timing.

Owing to the feature described above, there can be realized the valve timing control system in which controllability of the engine operation in the idling mode can be stabilized without rendering complex the arithmetic operation involved in the control In yet another preferred mode for carrying out the present invention, the control means may be so designed as to control the rotation speed of the internal combustion engine so that the rotation speed increases when the engine operating state is in the cold-state idling operation mode.

With the arrangement of the valve timing control system described above, temperature rise of the catalyst can further be promoted.

In still another preferred mode for carrying out the present invention, the control means may be designed as to control ignition timing of the internal combustion engine such that the ignition timing is retarded when it is detected that the engine operating state is in the cold-state idling operation mode.

With the arrangement of the valve timing control system mentioned above, temperature rise of the catalyst can further be accelerated.

In a further preferred mode for carrying out the present invention, the control means may be so designed as to control a fuel injection quantity such that the fuel injection quantity is decreased when it is detected that the engine operating state is in the cold-state idling operation mode.

With the arrangement of the valve timing control system described above, harmful exhaust gas components can further be reduced.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
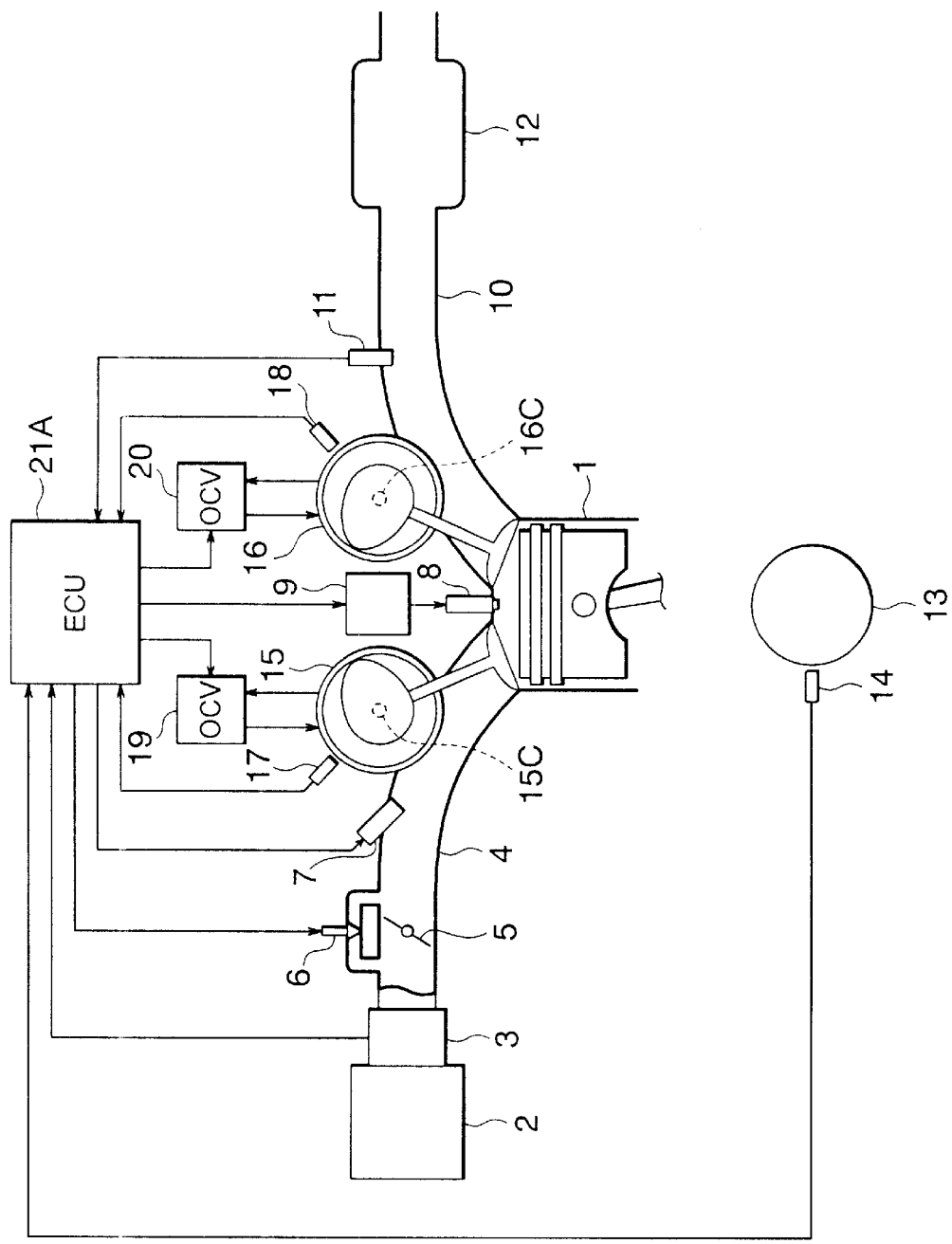
FIG. 1 is a schematic block diagram showing generally a configuration of a valve timing control system for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

In the following, a valve timing control system for an internal combustion engine according to a first embodiment of the present invention will be described in detail by reference to the drawings.

Figure 6:
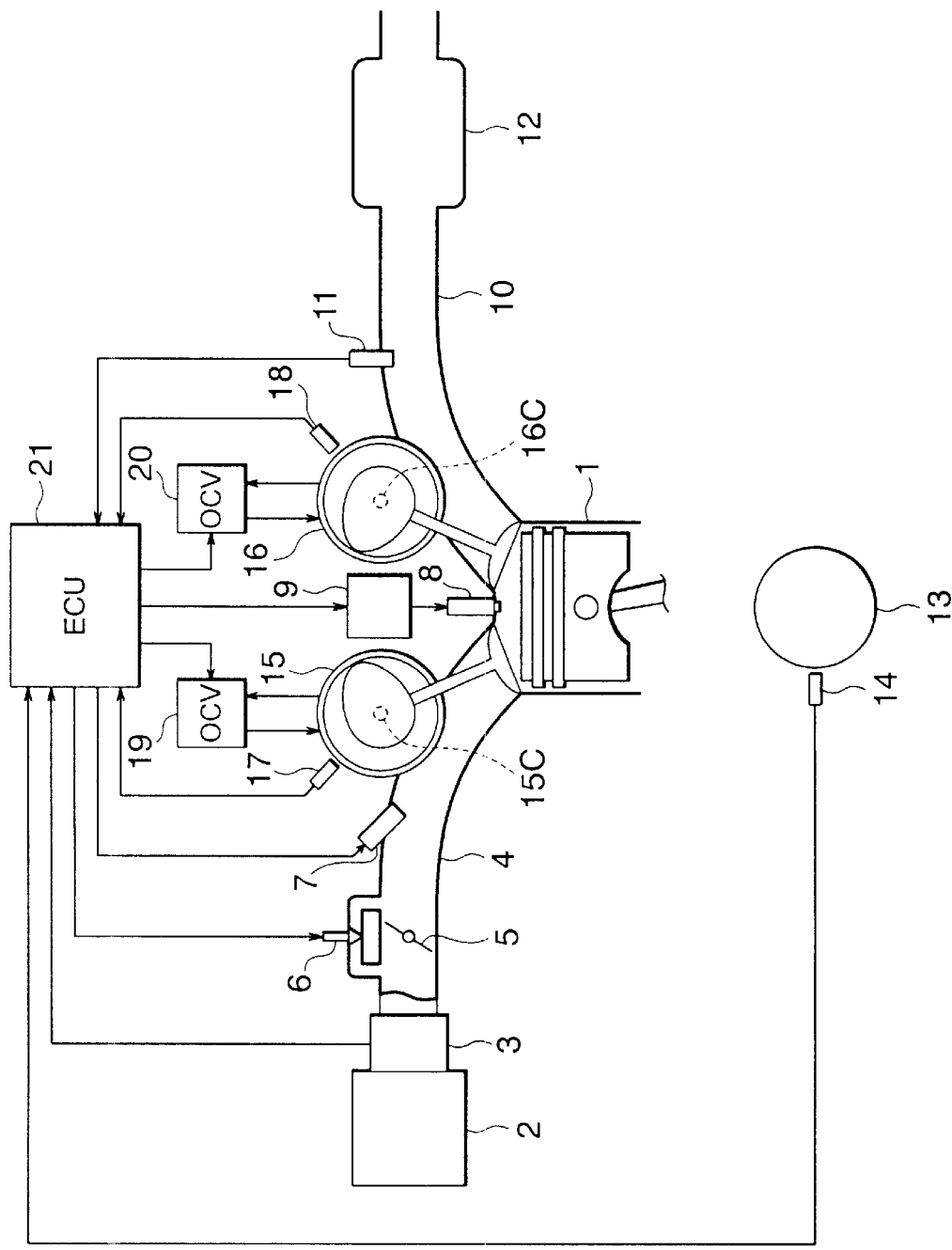
FIG. 6 is a functional block diagram showing generally and schematically a configuration of a conventional valve timing control system of an internal combustion engine known heretofore.

FIG. 1 is a schematic block diagram showing generally a configuration of the valve timing control system for the internal combustion engine according to the first embodiment of the invention. In FIG. 1, components same as or equivalent to those mentioned hereinbefore by reference to FIG. 6 are denoted by like reference characters as those used in this figure and detailed description thereof is omitted.

Figure 7:
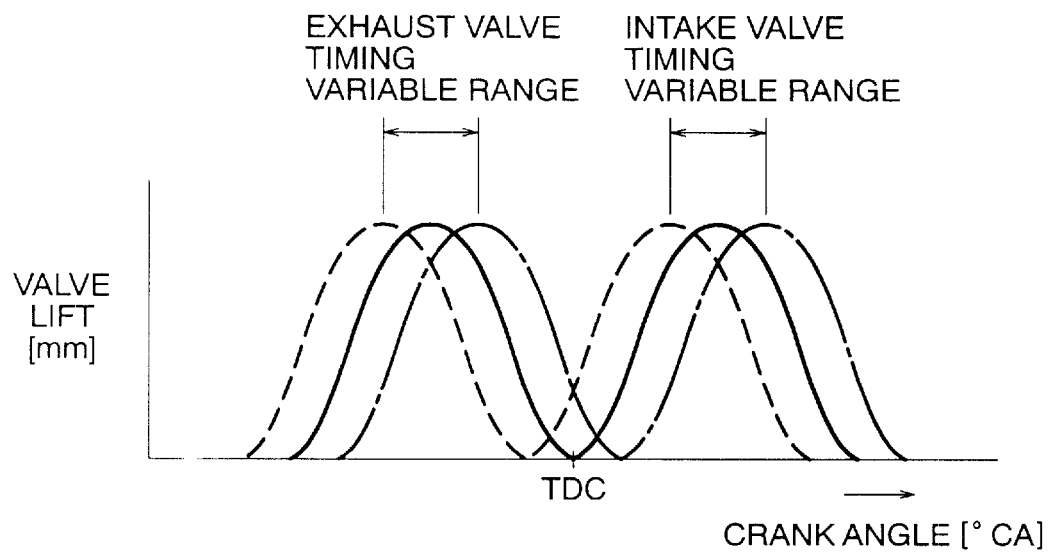
FIG. 7 is a view for illustrating a valve timing variable range in the conventional valve timing control system in terms of relation between crank angle and valve lift stroke.
Figure 8:
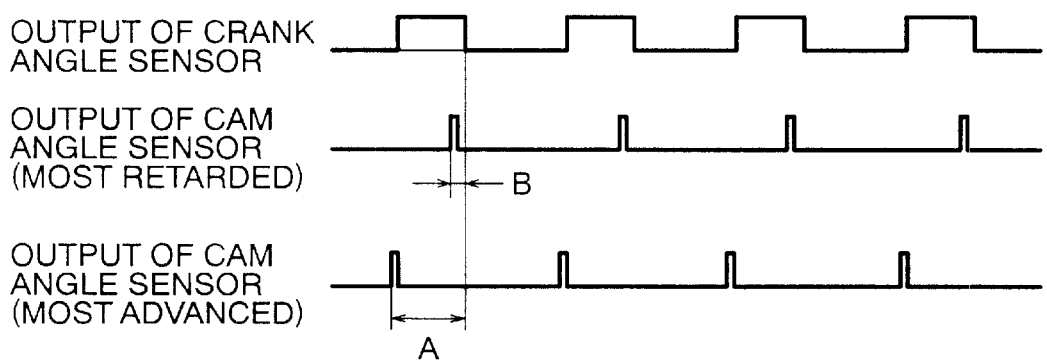
FIG. 8 is a timing chart for illustrating phase or timing relations between individual output pulse signals of a crank angle sensor and cam angle sensors, respectively.

In the valve timing control system for the internal combustion engine according to the instant embodiment of the invention, the control range for changing the valve timings of the intake valve and the exhaust valve is essentially same as that shown in FIG. 7, and the relation between the output of the crank angle sensor and those of the cam angle sensors are also essentially same as that illustrated in FIG. 8.

Figure 9:
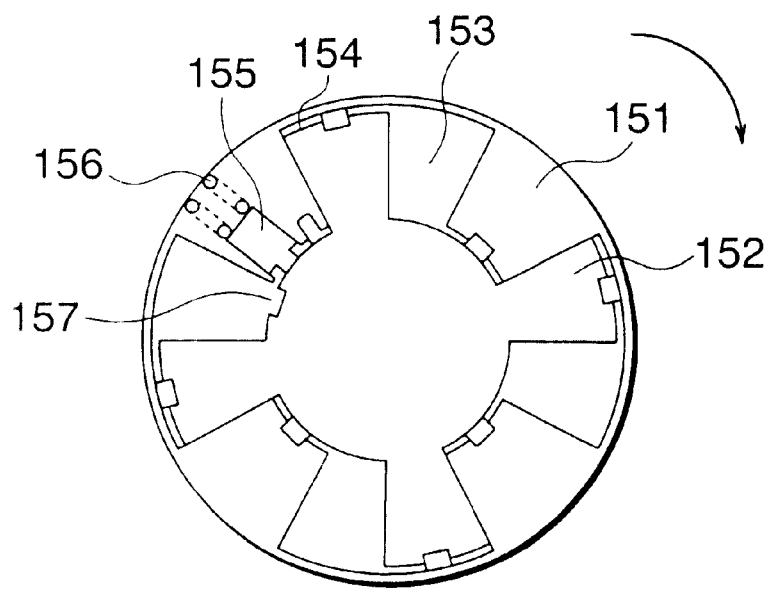
FIG. 9 is a perspective view showing an internal arrangement of a conventional actuator at a most retarded timing position.
Figure 10:
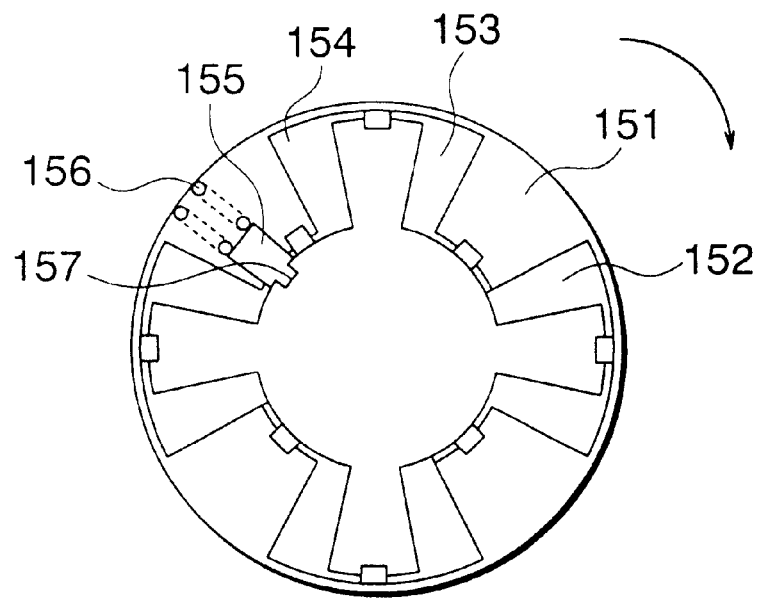
FIG. 10 is a perspective view showing an internal arrangement of the conventional actuator at a lock-up position.
Figure 11:
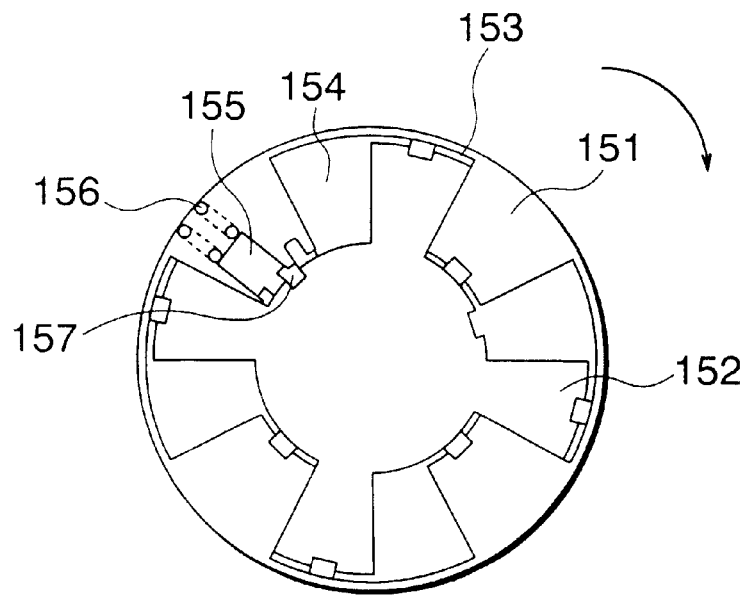
FIG. 11 is a perspective view showing an internal arrangement of the conventional actuator at a most advanced timing position.
Figure 13:
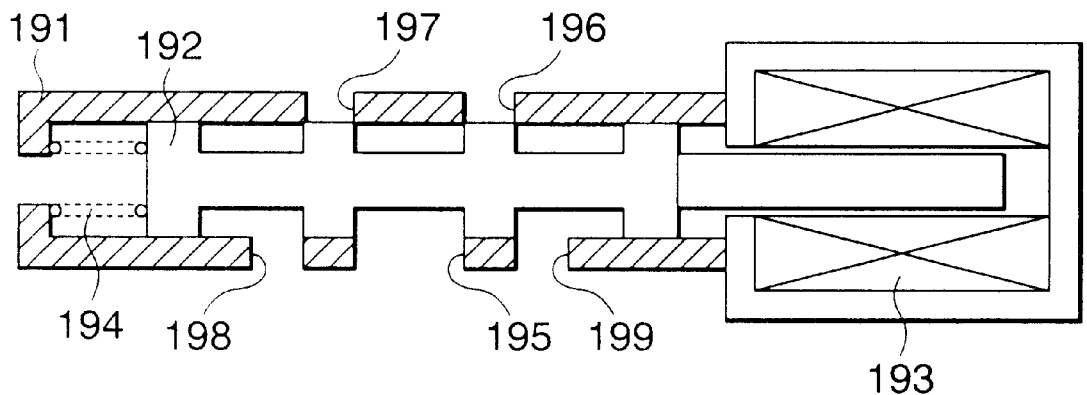
FIG. 13 is a side-elevational sectional view showing an internal arrangement of the conventional oil control valve unit in a lock-up state.
Figure 14:
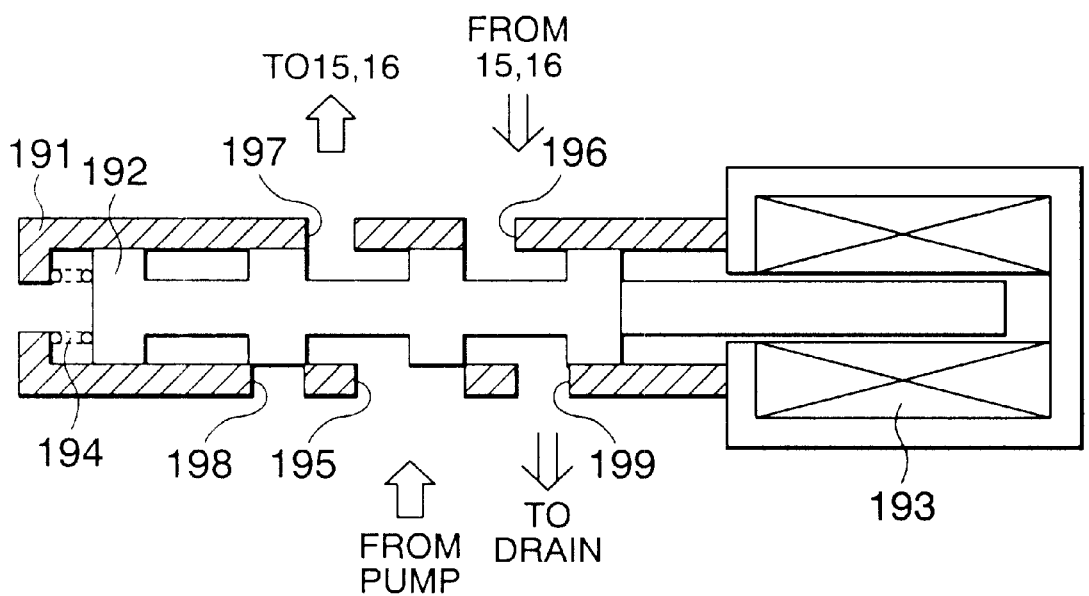
FIG. 14 is a side-elevational sectional view showing an internal arrangement of the conventional oil control valve unit in an electrically energized state.
Figure 15:
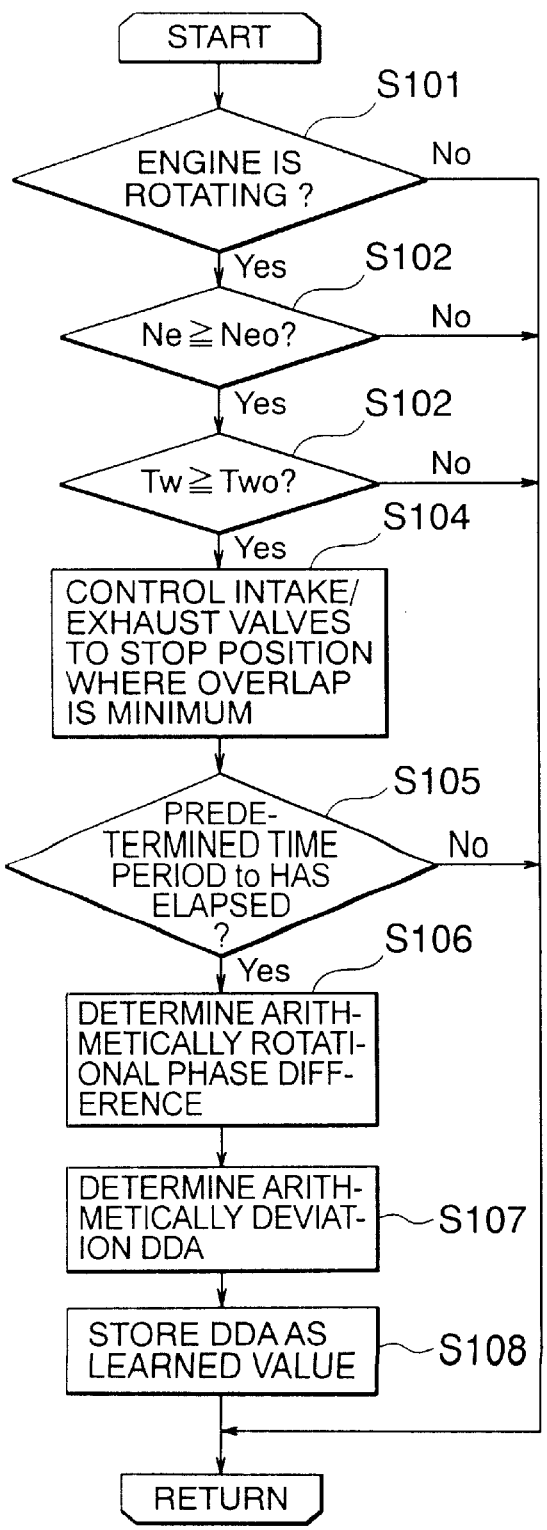
FIG. 15 is a flow chart for illustrating control operation of the conventional valve timing control system for the internal combustion engine.

Further, the actuators 15 and 16 are implemented in the structure which is essentially identical with that described hereinbefore by reference to FIGS. 9, 10 and 11. Further, the structures of the oil control valves (OCV) 19 and 20 are also essentially identical with those described hereinbefore in conjunction with FIGS. 12, 13 and 14.

Now, referring to FIG. 1, an electronic control unit (also referred to as the ECU in short) 21A shown in FIG. 1 includes a lock control means for setting the actuators 15 and 16 to the lock-up position or state by means of the locking mechanism and an unlock control means for allowing the retarding/advancing control of the actuators 15 and 16 to be carried out by releasing the actuators 15 and 16 from the lock-up state with the aid of an unlocking mechanism after the engine operation has been started, as described hereinbefore.

Additionally, in the valve timing control system now under consideration, the ECU 21A includes a cold-state idling operation control means for controlling the phases (angular positions) of the cam shafts 15C and 16C so that they are advanced relative to the crank shaft by means of the actuators 15 and 16 when it is detected that the engine 1 is operating in the idling mode in the cold state (i.e., the cold-state idling operation mode).

The aforementioned unlocking control means incorporated in the ECU 21A is so designed as to generate a predetermined hydraulic pressure from the oil pump in order to release the actuators from the locked state at least when the engine 1 is operating in the cold-state idling operation mode.

Besides, the ECU 21A incorporated in the valve timing control system includes a warm-up idling operation control means for setting the actuators 15 and 16 to the lock-up position or state when the engine 1 is operating in the idling mode in the warmed-up state (i.e., the warmed-up idling operation mode).

The position at which the actuators 15 and 16 are locked in the warmed-up idling operation mode is so set as to be preferable or desirable for the engine starting operation as well as for the engine operation state immediately succeeding thereto.

In other words, the position of the vane assembly 152 locked by the lock pin 155 (see FIG. 10) is so set that the valve timing suited for the engine starting operation can be realized.

As described hereinbefore, in the engine starting operation as well as in the state immediately succeeding to the engine starting operation, overretarding or overadvancing of the valve timing is accompanied with degradation of the starting performance of the engine. Thus, the relative position between the lock pin 155 and the locking recess 157 is previously so set that the valve timings suited for the engine starting operation as well as for the engine operation state immediately after the starting operation. In other words, the relative position mentioned above is not necessarily restricted to the mid or intermediate position described hereinbefore by reference to FIG. 10.

In the cold-state idling operation after the engine is started, the lock pins 155 of the actuators 15 and 16 have to be released from the locking recesses 157 for allowing the valve lift timings to be controlled so as to be shifted to an advanced position (or retarded position).

In this case, the lubricating oil pressure of the engine 1 is also made use of for effectuating operation of the actuators 15 and 16 as well as the operation for releasing the lock pin 155). In this conjunction, it is to be mentioned that the lubricating oil pressure will change in dependence on the engine rotation speed (rpm), oil temperature and the like.

As is apparent from the above, for effectuating the advancing control (or the retarding control) at least in the cold-state idling operation mode of the engine, it is required to generate the hydraulic pressure for releasing the lock pin 155.

After the advancing control (or the retarding control) in the cold-state idling operation mode, the actuators 15 and 16 are so controlled as to be set to the locked position.

In that case, a feedback control may be carried out such that the hydraulic pressure for sustaining the lock-up state can be maintained. Alternatively, the lock pin 155 may be engaged with the recess at the lock-up position.

When an acceleration pedal is depressed for starting running of the motor vehicle in the state described above, the rotation speed (rpm) of the engine increases, which results in that the lock-up state is cleared and thus the control of engine operation can be carried out at the retarded or advanced position (not at the lock-up position) in dependence on the prevailing operation state of the engine 1.

More specifically, referring to FIG. 1, the actuators 15 and 16 are locked at an intermediate or mid position between the most advanced position and the most retarded position upon engine starting operation, while the actuators 15 and 16 are controlled to be advanced (or retarded) to the mechanically delimited stop position where the effect of the temperature rise of the catalyst is brought about, in the cold-state idling operation mode which succeeds to the engine starting operation.

In this conjunction, it is also to be mentioned that the ECU 21A is so designed as to learn the phase differences (or relative phase) between the crank shaft and the cam shafts 15C and 16C detected by the cam angle sensors 17 and 18, respectively, as the reference positions for the most advancing control and the most retarding control, respectively, in the cold-state idling operation mode with a view to enhancing the position control performance when the valve timing control is actually carried out.

By learning the reference positions as mentioned above, the relative phase at a position intermediate between the most advanced position and the most retarded position can be controlled by the ECU 21A after the warming-up operation of the engine 1, whereby the position control performance can be enhanced.

Besides, even in the case where the reference positions have not been learned during the engine warming-up operation, the ECU 21A can learn the reference positions by controlling the relative phase toward the most advanced position (or the most retarded position) in the warmed-up state as in the case of the cold-state idling operation mode. At this juncture, it should also be mentioned that the direction in which the control is performed in the warmed-up state (i.e., the direction toward the most advanced position or the most retarded position) is set to the same direction as the control direction in the cold-state engine operation.

Figure 2:
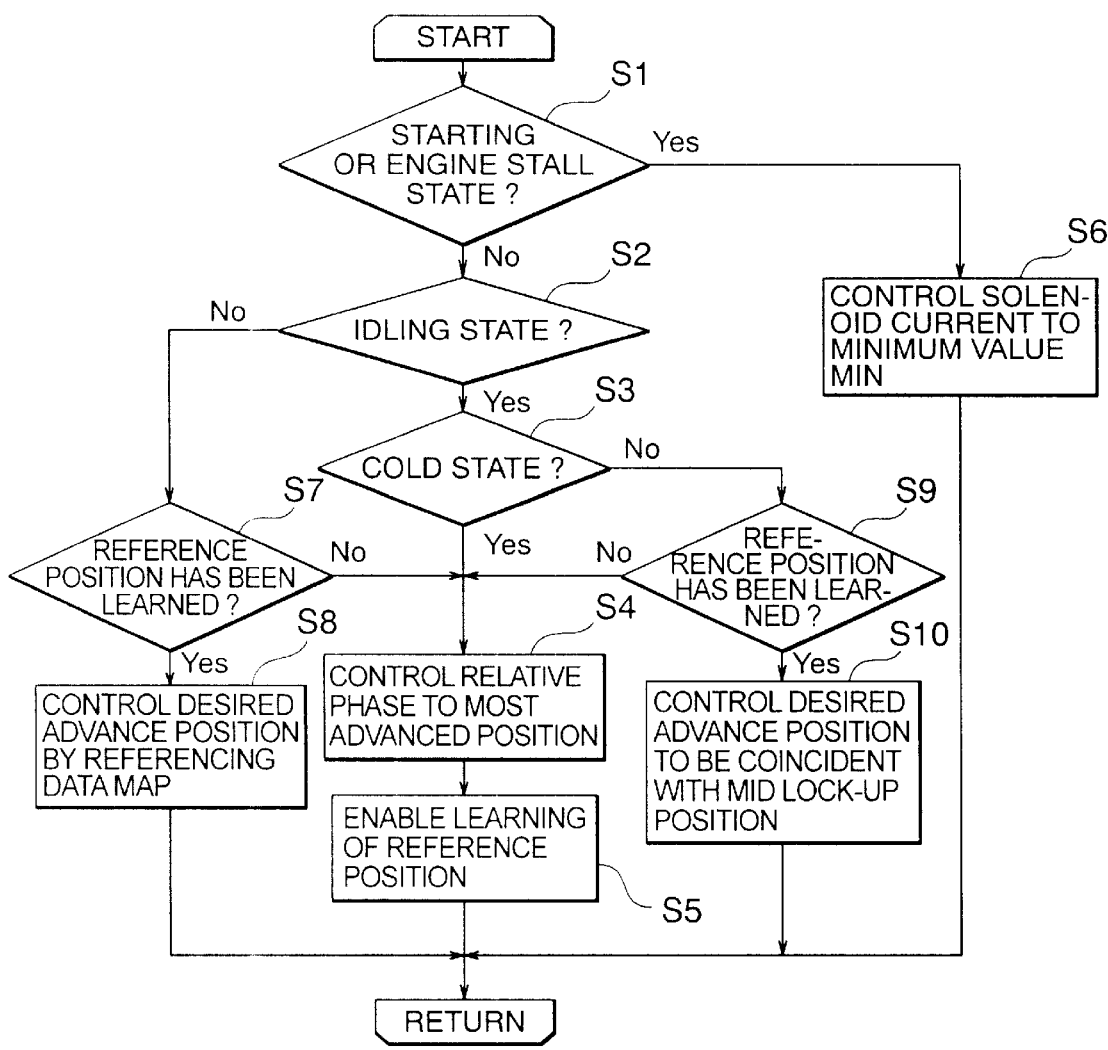
FIG. 2 is a flow chart for illustrating control operation of the valve timing control system according to the first embodiment of the present invention.

Next, referring to a flow chart shown in FIG. 2 together with FIGS. 7 to 14 mentioned hereinbefore, description will be directed to the operation of the valve timing control system according to the first embodiment of the present invention, which system is shown in FIG. 1.

Incidentally, the following description will be made representatively on the presumption that the valve timing is so controlled as to be set to the most advanced position for learning the reference position, being however understood that the teachings of the invention can equally be applied to the valve timing control to the most retarded position.

The processing routine illustrated in FIG. 2 is executed internally of the ECU 21A respectively at a predetermined time interval.

Referring to FIG. 2, decision is firstly made by the ECU 21A as to whether the engine 1 is in the starting state or in the stall state (step S1).

When it is decided in the step S11 that the engine 1 is in the starting state or in the stall state (i.e., when the decision step S11 results in the affirmation "Yes"), the current supplied to the solenoids or coils 193 of the oil control valves 19 and 20 is set to a minimum current level or value MIN (step S6), whereupon the procedure exits from the processing routine illustrated in FIG. 2.

In this conjunction, the minimum current value MIN mentioned above may be the current value in the nonconducting state of the solenoid (i.e., 0 mA). It is however preferred to maintain the minimum current value MIN on the order of 100 mA as a stand-by current value for the succeeding operation.

On the other hand, when it is decided in the step S11 that the engine is neither in the starting state nor in the stall state (i.e., when the decision step S1 results in negation "No"), decision is succeedingly made as to whether or not the engine 1 is in the idling state (step S2).

The decision as to the idling state in the step S2 can be made by checking whether the idle switch is in the on-state or off-state or alternatively checking whether the throttle valve is fully closed or not, as is well known in the art.

When the decision step S2 results in that the engine 1 is not in the idling state (i.e., when the step S2 results in "No"), the processing proceeds to a step S7 (described later on). On the other hand, when the decision step S2 results in that the engine 1 is in the idling state (i.e., when the step S2 results in "Yes"), decision is then made whether or not the engine 1 is in the cold state (step S3).

At this juncture, it should be added that the phrase "cold state" means, for example, a state where the cooling water temperature Tw of the engine 1 (which is detected or estimated) is equal to or lower than a predetermined temperature (e.g. 40 C. indicative of the warmed-up state of the engine). In the cold state where the cooling water temperature Tw is not higher than the predetermined temperature, the catalyst must be warmed up speedily for activation thereof.

When it is decided in the step S3 that the cooling water temperature Tw is equal to or higher than the predetermined temperature indicating the warmed-up state of the engine (i.e., when the decision step S3 results in negation "No"), this means that the engine 1 is not in the cold state. Then, the processing proceeds to a step S9 which will be described later on.

Further, when it is decided in the step S3 that the cooling water temperature Tw is not higher than the predetermined temperature and thus the engine 1 is in the cold state (i.e., when the decision step S3 results in affirmation "Yes"), the actuators 15 and 16 are set to the respective mechanical stop positions on the advance side, whereupon the relative phase of the cam angle is so controlled as to be set to the most advanced position (step S4).

More specifically, in the step S4, the current of the oil control valve 20 for the exhaust valve is set to a minimum value MIN, while the current of the oil control valve 19 for the intake valve is set to a maximum value or alternatively set such that a desired (or target) advance quantity can realize the most advanced position.

In succession to the most advancing control (step S4) mentioned above, phase difference between the crank shaft and the cam shaft 15C; 16C is finally learned as the reference position (step S5), whereon the processing routine shown in FIG. 2 comes to an end.

This learn step S5 should preferably be executed after confirming that the detected value of the phase difference between the crank angle and the cam angle has reached the value indicative of the most advanced position or alternatively after waiting for an estimated time which allows the detected phase difference value to become equal to the value indicative of the most advanced position.

At this juncture, it should be mentioned that the reason why the valve timing is controlled to the most advanced position in the step S4 in the cold idling operation mode of the engine can be explained by the fact that by advancing the valve-open start timing of the exhaust valve, the exhaust gas of a high temperature is discharged into the exhaust pipe 10 in the course of combustion, which contributes to acceleration of temperature rise of the catalyst 12, whereby harmful components contained in the exhaust gas discharged from the engine in the cold idling operation mode can be reduced more effectively.

The most advancing control of the valve timing may be carried out only for the exhaust valve. It goes however without saying that this control can simultaneously be performed for the intake valve. In that case, opening of the exhaust valve can be started earlier without increasing the valve overlap time period, which is advantageous in that the temperature rise of the catalytic converter 12 can be accelerated while ensuring stability for the idling operation of the engine.

On the other hand, when it is decided in the step S2 shown in FIG. 2 that the engine 1 is not in the idling state (i.e., when the decision step S2 results in "No"), it is then decided whether or not the reference position has already been learned (learned at least once) (step S7).

When decision is made in the step S7 that the reference position has already been learned (i.e., when the decision step S2 results in "Yes"), the desired advance quantity is then adjusted by referencing an interpolation data map in consideration of the engine operation state (engine rotation speed and engine load) to thereby perform the optimum valve timing control which conforms with the current operating state of the engine 1 (step S8), whereupon the processing routine illustrated in FIG. 2 comes to an end.

In a step S8, feedback control is carried out so that the desired position stored as the map data in the ROM (Read-Only Memory) incorporated in the ECU 21A can be substantiated.

As mentioned previously, the reference data map for the desired advanced positions is previously stored in the ROM incorporated in the ECU 21A in such a manner that the map data can be interpolated in dependence on the engine rotation speed (rpm) and the engine load both serving as parameters.

When it is decided in the step S7 that the reference position has not been learned yet (i.e., when the decision step S7 results in negation "No"), then the processing proceeds to the steps S4 and S5 mentioned previously, where the most advancing control (i.e., control for shifting to the most advanced position) is carried out (step S4) for the purpose of learning the reference position (step S5).

On the other hand, when it is decided in the step S3 that the engine 1 is not in the cold state (i.e., when the decision step S3 results in "No"), decision is then made in a step S9 as to whether or not the reference position has already been learned. When it is decided in the step S9 that the reference position has already been learned (i.e., when the decision step S9 results in "Yes"), the desired advance quantity is so regulated that the mid lock-up position can be substantiated (step S10), whereupon the processing routine shown in FIG. 2 comes to an end.

The intermediate lock-up position mentioned above in conjunction with the step S10 is so set that the valve timing which is suited for the engine performance upon starting operation thereof can be realized. Since this position is also suited for ensuring stability in the idling operation mode, variation in the rotation speed of the engine in the idling operation mode can satisfactorily be suppressed.

Further, when it is decided in the step S9 that the reference position has not been learned yet (i.e., when the decision step S9 results in "No"), the processing proceeds to the steps S4 and S5 described previously.

The reference position (the learned value) once learned and stored in the step S5 is held. as it is unless the backup power supply to the ECU 21A is interrupted or broken, which may be brought about by removing the onboard battery or for other reasons.

Owing to the feature described above, vain efforts of repeating the most advancing control processing and the learn processing (steps S4 and S5) can be avoided even in the warm-up state in the succeeding engine starting operation.

As is apparent from the above, in the cold-state idling operation mode of the engine 1, the valve timing can be so controlled as to be most advanced with the aim of accelerating the activation of the catalyst 12 and the position corresponding to this most advanced valve timing can be learned as the reference position.

On the other hand, when the reference position as learned is erased or cleared due to, for example, removal of the battery in succession to the warm-up operation of the engine 1, incurring such situation equivalent to such state where the learning of the reference position has not been performed yet (i.e., the unlearned (not-yet-learned) state), the valve timing is forcibly controlled so as to assume the most advanced position for making the reference position be learned again.

In this manner, the engine control performance can be enhanced through the valve timing optimization control effectuated every time when the engine is put into ordinary operation, whereby sufficient or adequate engine performance can satisfactorily be ensured.

In the valve timing control system according to the instant embodiment of the invention, which is shown in FIG. 1, the actuators 15 and 16 are disposed in association with both the cam shaft 15C for the intake valves and the cam shaft 16C for the exhaust valves, respectively. However, the invention is never restricted to such arrangement. Only one of the actuators 15 and 16 may be disposed in association with one of the cam shafts 15C and 16C.

Furthermore, in the valve timing control system described above, each of the actuators 15 and 16 is implemented such that the vane assembly 152 for changing the phase angle are rotationally moved or displaced within the housing 151, as described hereinbefore by reference to FIGS. 9 to 11. However, the invention is not restricted to such structure of the actuator either. Other types of actuators such as of helical type or the like may equally be employed.

Further, it has been described in conjunction with the flow chart of FIG. 2 that the valve timing is so controlled that the intake/exhaust valve assumes the most advanced position for the purpose of learning the reference position in the cold-state idling operation mode. However, the valve timing may be controlled toward the most retarded position although it depends on the design of the engine 1.

By way of example, the valve timing may be controlled to be retarded in the cold idling operation mode in dependence on the type of the engine 1 so that the timing at which the exhaust valve is closed is retarded among others. In that case, some part of the combustion gas is again taken into the combustion chamber, as a result of which the combustion temperature becomes lowered with the temperature of the exhaust gas being increased.

Thus, in the case of this type engine, the valve timing is controlled toward the most retarded position in the cold idling operation mode instead of the control in the step S4 shown in FIG. 2, to thereby causing the temperature rise of the catalyst 12 to be accelerated while allowing the most retarded position to be learned as the reference position.

Additionally, in the case where the valve timing is controlled toward the most retarded position in the cold idling operation mode, the most retarding control is also carried out upon learning of the reference position in succession to the warm-up operation. owing to this feature, difference in performance or behavior of the engine 1 between the cold state and the warm-up state thereof can be made less significant.

As is apparent from the foregoing, by controlling the valve timing to the most advanced position (or the most retarded position) in the cold idling operation mode for the purpose of learning the reference position, there can be realized not only accelerated activation of the catalyst 12 but also enhanced accuracy of the cam angle control.

After the warm-up operation, the valve timing is controlled by using the learned value (the reference position). When the learned value has not been available yet in the state in which the engine has been warmed up, the valve timing is so controlled as to assume the most advanced position (or the most retarded position) for the purpose of learning the reference position.

Embodiment 2

In the case of the valve timing control system for the internal combustion engine according to the first embodiment of the invention, such arrangement is adopted that when it is decided in the step S7 or S9 shown in FIG. 2 that the reference position has not been learned yet (i.e., when the decision step S7 or S9 results in "No"), only the learn processing (steps S4; S5) of the reference position is executed through the most advancing control (or the most retarding control). However, other control(s) for the engine 1 such as fuel injection control, ignition timing control or the like may additionally be carried out. A second embodiment of the present invention is directed to the valve timing control system in which the fuel injection control, the ignition timing control, ISC (Idle Speed Control valve) and/or the throttle opening control is adopted.

In the internal combustion engine equipped with the valve timing control system, there is a tendency that the rotation of the engine 1 varies when the valve timing is set to the most advanced position (or the most retarded position) in the engine warm-up operation mode. Accordingly, the ECU 21A is so designed as to control the fuel injection, ignition timing or the like with the aim to prevent or suppress the variation of the rotation, engine stall and like events.

Figure 3:
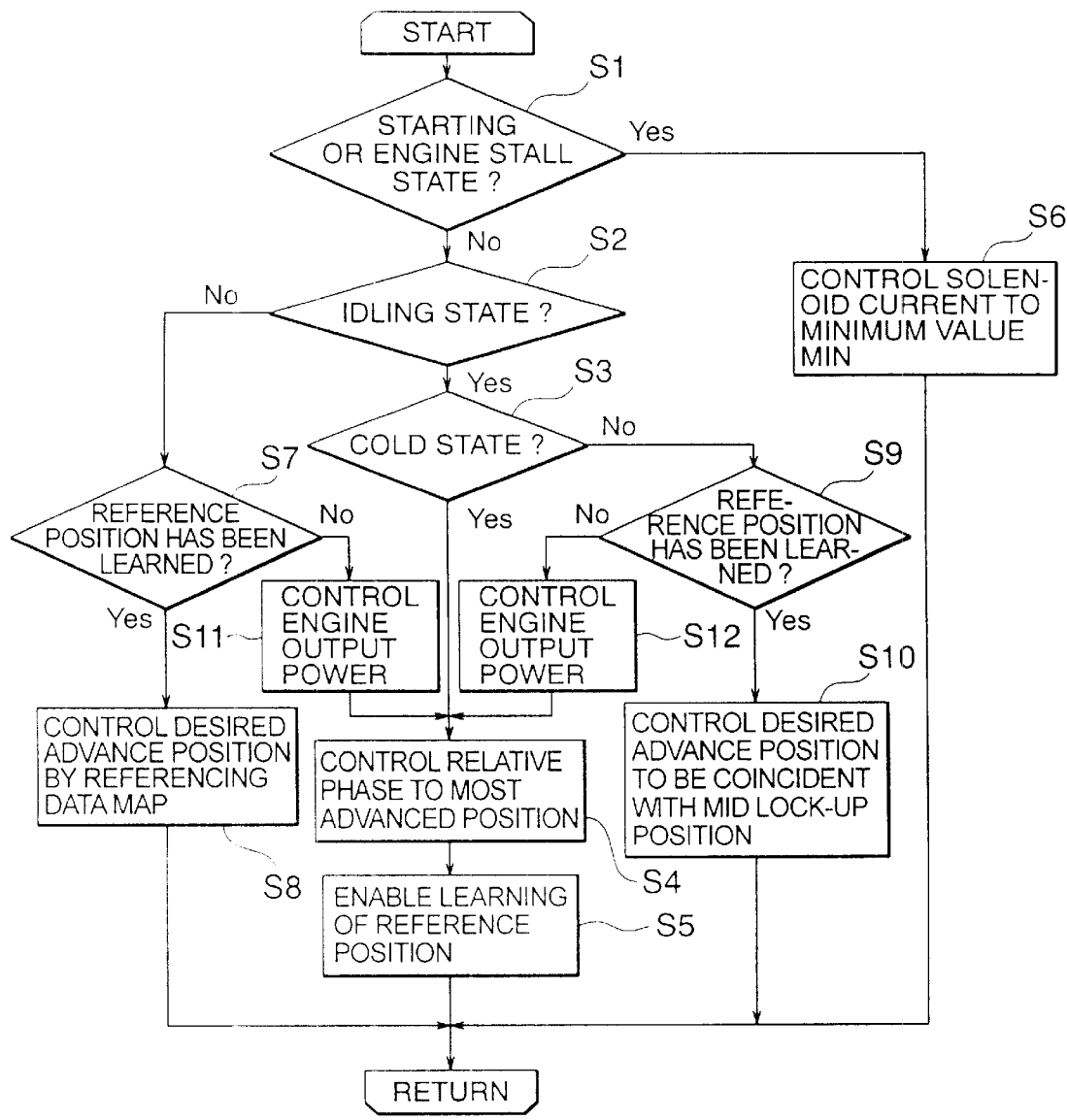
FIG. 3 is a flow chart for illustrating control operation of a valve timing control system according to a second embodiment of the present invention.

In the following, description will be directed to the valve timing control system for the internal combustion engine according to a second embodiment of the present invention, which system is designed to perform additionally an engine control processing in case the reference position has not been learned yet. FIG. 3 is a flow chart for illustrating a control process carried out by the valve timing control system according to the second embodiment of the invention, wherein the processing steps similar to those descried hereinbefore by reference to FIG. 2 are affixed with like step identification numbers. Accordingly, repeated description in detail of these steps is omitted in the elucidation which follows.

Now, referring to FIG. 3, when it is decided in a step S2 that the engine operation state is not in the idling state (i.e., when the decision step S2 results in "No") and further decided in the step S7 that the reference position has not been learned yet (i.e., when the decision step S7 results in "No"), an output control is carried out for the engine 1 (step S11) in addition to execution of the learn processing in the steps S4 and S5.

Similarly, when it is decided in a step S3 that the engine is not in the cold state (i.e., when the decision step S3 results in "No") and further decided in the step S9 that the reference position has not been learned yet (i.e., when the decision step S9 results in "No"), an output control of the engine 1 (step S12) is performed in addition to the learn processing in the steps S4 and S5.

The engine output control performed in the steps S11 and S12 may include, for example, fuel injection control, ignition timing control, idle speed control valve (ISC) control and throttle opening degree control.

More specifically, the ECU 21A controls at least one of the fuel quantity injected into the engine cylinder, the ignition timing, the idle speed control valve and the throttle opening degree when the processing for learning the reference position is executed in the warm-up state, to thereby regulate the output torque of the engine 1 so that the operating state of the engine becomes substantially same as the state prevailed before the control for learning/storing the reference value (i.e., the control for setting the most advanced position or the most retarded position) is performed.

As described hereinbefore, the most advanced position is learned as the reference position for the valve timing control in the cold-state idling operation mode (steps S4 and S5). The ordinary valve timing control is performed by referencing the data map on the basis of the learned value (reference position) (step S8). In the warm-up operation mode, the valve timing control is performed at the intermediate or mid position between the most advanced position and the most retarded position (step S10). When the reference position has not been learned yet, the engine output control is carried out in order to suppress or prevent variation of the engine rotation speed and the engine stall event in addition to learning of the reference position (steps S11 and S12).

In general, when the valve timing of the exhaust valve is so controlled as to advance, the exhaust valve starts to open at an earlier time point. As a result of this, the actual or effective expansion stroke is shortened. Consequently, combustion energy transformed to the rotatory power of the crank shaft becomes lowered, incurring thus the unwanted possibility that variation of the engine rotation speed and/or the engine stall event may occur.

Thus, for the purpose of avoiding variation of the engine rotation speed and the engine stall event, torque generated by the engine 1 is regulated by performing, for example, the control for increasing the fuel injection quantity (control for reducing the air-fuel ratio A/F, i.e., rich control), the control for advancing the ignition timing, the control for increasing the opening degree of the idle speed control valve and/or the control for increasing the opening degree of the throttle valve in the steps S11 and S12 mentioned above.

The exhaust valve opening start timing can be advanced without extending the valve overlap period by performing simultaneously the most advancing control for the valve timing of the intake valve, which is effective for preventing the engine torque from being lowered because the internal exhaust gas recirculation (EGR) quantity can be prevented from increasing due to the extension of the valve overlap period.

Further, in the case where the most retarding control is performed in place of the most advancing control in the step S4, there may arise the possibility that the engine output torque becomes lowered due to suction of the combustion gas by the engine cylinder, as described hereinbefore. Thus, the engine output torque control similar to the control described above is performed (steps S11, S12) for suppressing or preventing occurrence of variation of the engine rotation speed and the engine stall event.

Embodiment 3

In the valve timing control system according to the first embodiment of the present invention, the detection value of the cam angle sensor 17; 18 is learned and stored only when the most advancing control (or the most retarding control) is performed in the cold-state idling operation mode. A third embodiment of the present invention is directed to the valve timing control system which is so designed as to learn and store additionally the detection value of the cam angle sensor 17; 18 as a second reference position when the valve overlap is controlled to be decreased in the course of the ordinary valve timing control.

More specifically, in the valve timing control system according to the instant embodiment of the invention, the ECU 21A is designed or programmed such that when the relative phase of the cam shaft 15C; 16C is controlled in the direction in which the overlap quantity between the intake valve and the exhaust valve is decreased (i.e., in the direction toward the most retarded position) in the course of the ordinary map control of the relative phase of the cam shaft 15C; 16C (step S8), the detection value of the cam angle sensor 17; 18 is learned and stored as the second reference position.

In other words, when the valve overlap tends to increase in the state where the engine 1 is in the cold state and where the relative phase of the cam shaft 15C; 16C is so controlled as to advance (retard) more than in the warm-up state, the detection value of the cam angle sensor 17; 18 (i.e., the second reference position) is learned to be stored when the relative phase of the cam shaft 15C; 16C is controlled toward the most retarded position (or the most advanced position) so that the overlap between the intake valve and the exhaust valve in the ordinary valve timing control state is decreased.

In general, it is known that stability can be ensured not only for the idling operation but also for the combustion owing to decrease of the internal exhaust gas recirculation (EGR) quantity, when the overlap period is short, which is thus favorable for preventing or suppressing the occurrence of the engine stall or the like event.

Figure 12:
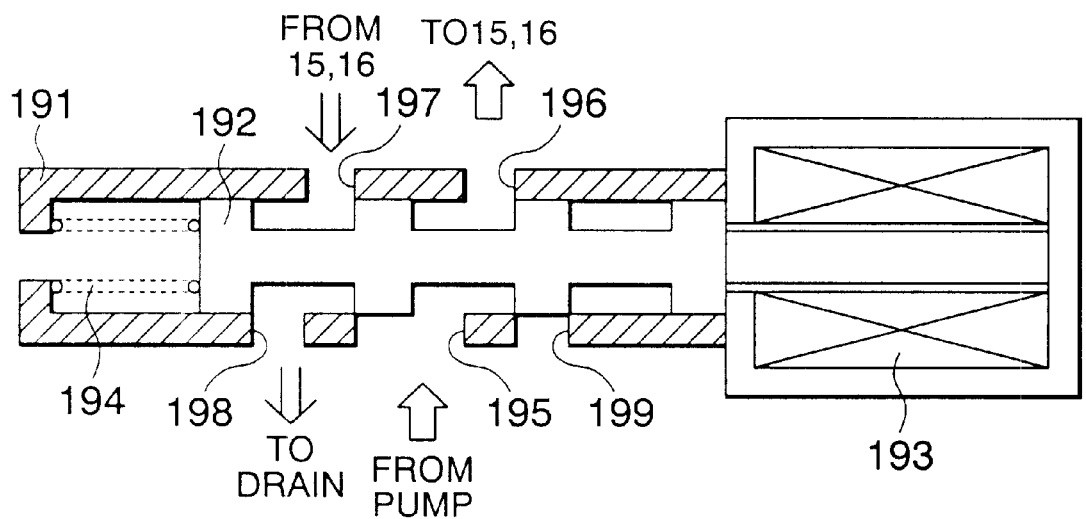
FIG. 12 is a side-elevational sectional view showing an internal arrangement of a conventional oil control valve unit (hydraulic pressure supply means) in an electrically deenergized state.

In this conjunction, it should also be recalled that the oil control valve 19; 20 assumes the state illustrated in FIG. 12 under the action of the spring 194 when no electric power is supplied to the solenoid thereof.

Referring again to FIG. 12, by adopting the oil passage arrangement which allows the valve overlap to be minimized, occurrence of the instable idling state or engine stall event can effectively suppressed or prevented even when wire breakage or the like failure should take place in the oil control valve 19; 20, whereby a sort of fail-safe feature can realized.

Such being the circumstances, it is desirable to learn the position of the cam shaft in the fail-safe state as the reference position for the valve timing control.

More specifically, in the case where the control direction is set toward the most advanced position upon learning of the reference position for storage, the most retarded position of the intake valve in the ordinary valve timing control should preferably be learned as the second reference position for storage.

As described hereinbefore, in the cold state of the engine 1, the most advancing control (i.e., control toward the most advanced position) is performed for both the intake and exhaust valves with a view to accelerating the activation of the catalyst 12 (step S4).

In that case, for the exhaust valve, control toward the most advanced position is effective for minimizing the valve overlap. Accordingly, no problem will arise concerning the fail-safe feature mentioned above.

On the other hand, for the intake valve, the control toward the most retarded position is effective for minimizing the valve overlap and hence ensuring the fail-safe feature. Accordingly, the most retarded position should be learned as the second reference position for effectuating the phase angle control.

Now, description will be made of the valve timing control system for the internal combustion engine according to the third embodiment of the present invention, which system is designed to learn and store the second reference position during the ordinary valve timing control.

Figure 4:
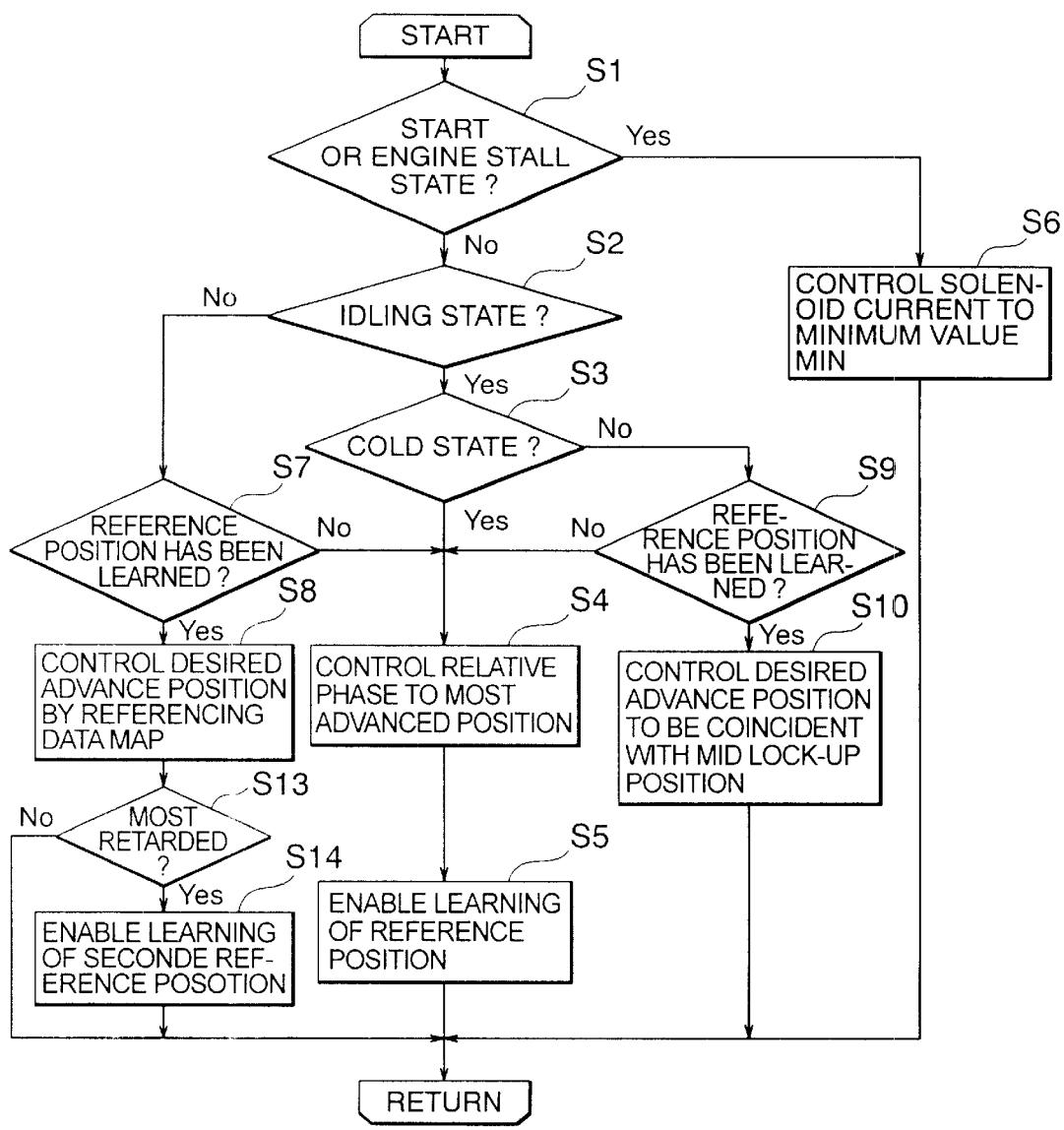
FIG. 4 is a flow chart for illustrating control operation of the valve timing control system according to a third embodiment of the present invention.

FIG. 4 is a flow chart for illustrating the control operation of the valve timing control system according to the third embodiment of the invention, wherein the processing steps similar to those descried previously by reference to FIGS. 2 and 3 are affixed with like step numbers and repeated description in detail of these steps is omitted.

Referring to FIG. 4, when it is decided in the step S4 that the reference position has already been learned (i.e., when the decision step S7 results in affirmation "Yes"), the actual advance quantity is controlled by referencing the map data so that the target or desired advance quantity follows the optimum desired position conforming to the engine operation state (step S8) and then it is decided whether or not the desired advance quantity corresponds to the most retarded position (step S13).

When decision is made in the step S13 that the actual advance quantity is also controlled in following the most retarded position (i.e., when the decision step S13 results in affirmation "Yes"), the detected value of the most retarded position is learned for storage as the second reference position (step S14), whereupon the processing routine shown in FIG. 4 comes to an end.

By contrast, when it is decided in the step S13 that the actual advance quantity is not controlled in following the most retarded position (i.e., when the decision step S13 results in negation "No"), execution of the processing in the step S14 is skipped, and the processing routine shown in FIG. 4 is terminated.

The ECU 21A performs the arithmetic operation for controlling each valve by using not only the reference position learned and stored in the cold-state idling operation mode but also the second reference position.

At this juncture, it should be mentioned that in the control of the actual advance quantity in following the desired advance quantity (step S8), the control procedure can be simplified with the number of programming steps being decreased so long as no alteration of the control is required regardless of change of the reference position.

In the following, the processing in the step S8 will be described in concrete for realizing simplification of the control program and reduction of the programming steps.

At first, it is assumed that the most advanced position is learned as the reference position in the steps S4 and S5 shown in FIG. 4. In that case, let's represent the actual advance quantity by Ra, the advance quantity detected by the cam angle sensor by Sa, the angle of operation of the actuator by Da and the most advanced value as learned by La, respectively. Then, the actual advance quantity Ra can arithmetically be determined in accordance with the following expression (1):

$$Ra=Sa+Da-La \tag{1}$$

In the expression (1), the angle of operation Da is given by the angle between the position of the actuator 15; 16 which correspond to the most advanced position and the position which corresponds to the most retarded position, respectively.

On the other hand, assuming that the most retarded position is learned instead of the most advanced position as the reference position to be stored, and representing by reference symbol Lr the most retarded position value as learned, then the actual advance quantity Ra can arithmetically be determined in accordance with the following expression (2):

$$Ra=Sa-Lr \tag{2}$$

As is apparent from the above, what is required is only the alteration of the arithmetics for determining the actual advance quantity Ra in accordance with the above-mentioned expression (1) or (2). There arises no necessity of altering or modifying the succeeding control process.

More specifically, in the case where the most advanced position value La has been learned with the most retarded position value Lr remaining to be learned in the phase control for the intake valve, the actual advance quantity Ra is arithmetically determined in accordance with the above-mentioned expression (1).

On the other hand, in the case where both the most advanced position value La and the most retarded position value Lr have already been learned, the actual advance quantity Ra is arithmetically determined in accordance with the expression (2).

In this conjunction, it should be mentioned that in the expressions (1) and (2) mentioned above, the advance quantity Sa detected by the cam angle sensor can arithmetically be determined on the basis of the crank angle Ac and the cam angle Acam in accordance with the following expression (3):

$$Sa=Ac-Acam \tag{3}$$

In the above expression (3), the crank angle Ac is given by a value which results from transformation of the falling time point (trailing edge time point) of the detection pulse of the crank angle sensor 14 into angle, while the cam angle Acam is given by a value which results from transformation of the rising time point (leading edge time point) of the detection pulse of the cam angle sensor 17; 18 into angle. In practical applications, the crank angle Ac and the cam angle Acam can be acquired by measurement with a timer incorporated in the ECU 21A.

At this juncture, it should also be added that although the advancing control should intrinsically be performed by learning the reference position on the fail-safe side where the valve overlap is small, the advancing control may equally be performed by learning the reference position in the range where fail-safe feature can not be ensured, for the purpose of enhancing the control accuracy in the case where the reference position has not been learned yet in the fail-safe range.

As is apparent from the foregoing, in the valve timing control system according to the third embodiment of the present invention,, the control procedure such as, for example, PD (proportional plus derivative) control or the like can remain essentially unchanged. It is only required to select the expression (1) or (2) for determining arithmetically the actual advance quantity Ra, as described above. Thus, the control procedure is simplified and hence the step number involved in developing the program can be reduced.

Embodiment 4

In the case of the valve timing control system according to the first embodiment of the invention, no consideration has been paid to the control of the engine 1 in the cold-state idling operation mode. A fourth embodiment of the present invention is directed to the control for increasing the rotation speed (rpm) of the engine in addition to learning of the reference position in the cold-state idling operation mode.

In the following, description will be directed to the valve timing control system according to the fourth embodiment of the present invention, which system is designed to control the engine rotation speed (rpm) so that it is increased in the idling operation carried out in the cold state of the engine.

Figure 5:
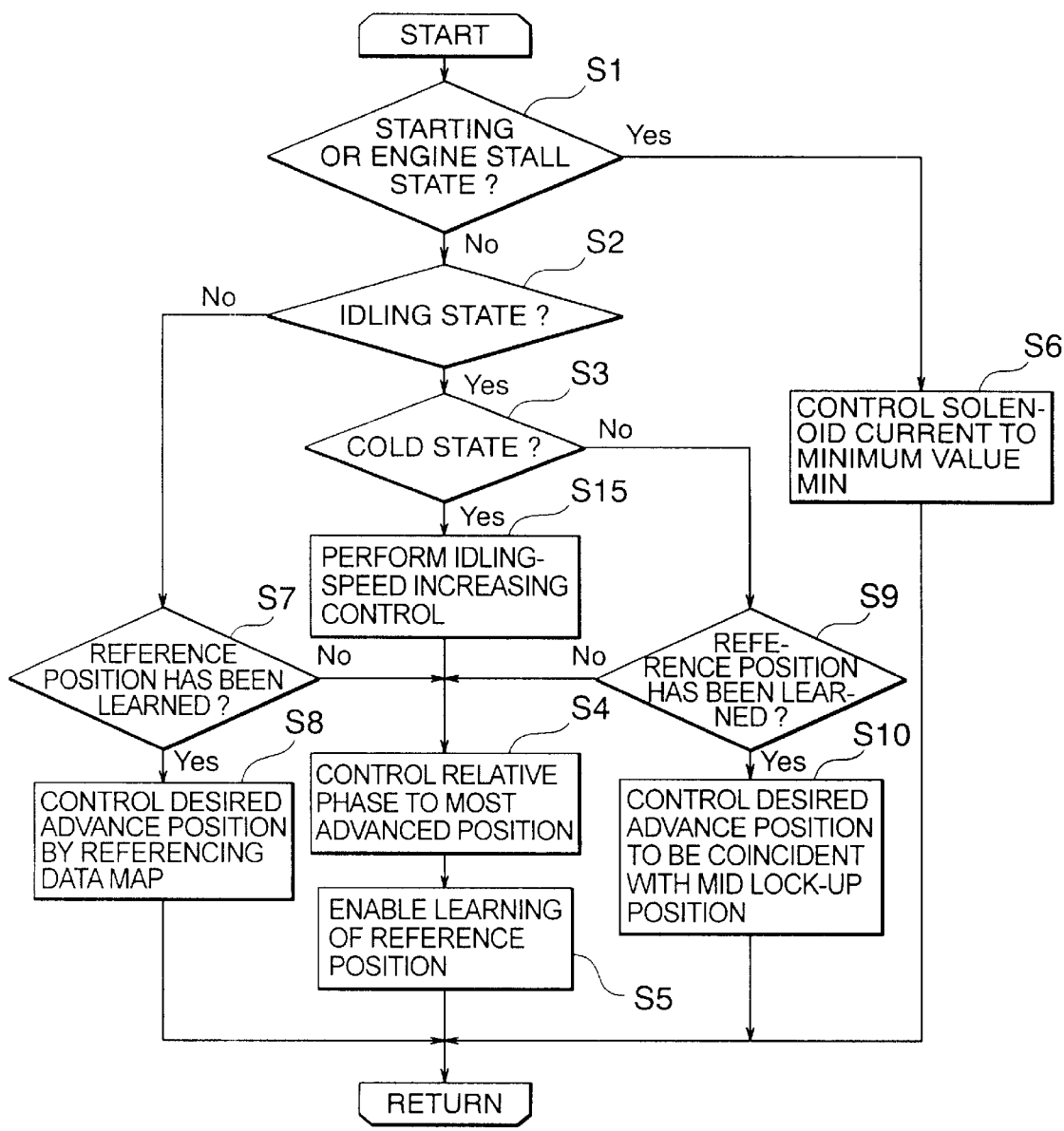
FIG. 5 is a flow chart for illustrating control operation of the valve timing control system for the internal combustion engine according to a fourth embodiment of the present invention.

FIG. 5 is a flow chart for illustrating control operation of the valve timing control system according to the fourth embodiment of the invention, wherein the processing steps similar to those descried previously by reference to FIGS. 2 to 4 are affixed with like step identification numbers and repeated description of these steps in detail is omitted.

Now referring to FIG. 5, when it is decided in the step S3 that the engine 1 is operating in the cold-state idling operation mode (i.e., when the decision step S3 results in "Yes"), the control for increasing the idle rotation speed (rpm) is carried out in a step S15 in addition to the reference position learning and storing operation (steps S4, S5), to thereby increase the idle rotation speed (rpm) (i.e., engine rotation speed in the cold-state idling operation mode) beyond the ordinary idle rotation speed.

By increasing the idle rotation speed (rpm) in the cold-state idling operation mode of the engine in this manner, the exhaust gas quantity increases as a result of which the amount of heat for activating the catalyst 12 is increased, whereby the catalyst 12 can be activated more speedily.

Thus, by executing the above-mentioned step S15 in combination with the valve timing advancing control (step S4), temperature rise of the catalyst can effectively be accelerated or promoted.

Embodiment 5

In the case of the valve timing control system according to the fourth embodiment of the invention, the control of increasing the idling rotation speed (rpm) is carried out (step S15). By contrast, a fifth embodiment of the present invention is directed to the valve timing control system which is so designed as to perform the ignition timing retarding control instead of the executing the step S15 described above.

By carrying out the ignition timing retarding control in the cold-state idling operation mode, temperature rise of the exhaust gas is promoted, whereby the activation of the catalyst can further be accelerated as in the case of the fourth embodiment described above.

Furthermore, it should be added that the quantity of fuel injected into the cylinder of the engine 1 may also be so controlled that it is decreased (i.e., the air-fuel ratio A/F is increased, to say in another way) in place of the control for retarding the ignition timing in the step S15, substantially to the similar effect.

By increasing the air-fuel ratio A/F so that the fuel mixture becomes lean, as described above, the amount of the harmful components contained in the exhaust gas can be reduced.

Furthermore, it goes without saying that in addition to the valve timing advancing control (step S4), the idle rotation speed increasing control, the ignition timing retarding control and/or the fuel injection decreasing control (air-fuel ratio A/F increasing control) may be performed in arbitrary combination. In that case, there can be realized the desired effects in combination.

Finally, it should be also be mentioned that some engine has such specification that the temperature rise accelerating effect of the catalyst becomes effective by retarding the valve timing in the cold-state idling operation mode, as described previously. Accordingly, in the case where the reference position has not been learned in the cold-state idling operation mode, the valve timing may be controlled toward the most retarded position for learning the reference position, whereon the valve timing advancing control may be performed with reference to the learned most retarded position set as the reference position.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A valve timing control system for an internal combustion engine, comprising:
    a sensor for detecting operating states of an internal combustion engine;
    an intake valve driving cam shaft and an exhaust valve driving cam shaft for driving intake and exhaust valves, respectively, of said internal combustion engine in synchronism with rotation of a crank shaft of said engine;
    an actuator operatively connected to at least one of said intake valve driving cam shaft and said exhaust valve driving cam shaft;
    a hydraulic pressure supplier for feeding a hydraulic pressure to drive said actuator;
    a control unit for controlling the hydraulic pressure fed from said hydraulic pressure supply to said actuator, wherein the control unit changes a relative phase of said cam shaft relative to said crank shaft based on said operating states of said internal combustion engine;
    a crank angle sensor for detecting a rotational position of said crank shaft;
    cam angle sensors for detecting rotational positions of said intake valve driving cam shaft and said exhaust valve driving cam shaft, respectively,
    wherein the actuator include;
        a retarding hydraulic chamber and an advancing hydraulic chamber for setting a variable range within which said relative phase of said cam shaft can be changed;
        a locking mechanism for setting said relative phase to a lock-up position within said variable range; and
        an unlocking mechanism for releasing said locking mechanism in response to a predetermined level of the hydraulic pressure fed from said hydraulic pressure supplier,
    wherein said control unit;
        when said internal combustion engine is detected as being in a starting operation state, is designed for driving said locking mechanism so that the locking mechanism sets said relative phase to said lock-up position;
        when said internal combustion engine is in a state which follows said starting operation state, is designed to control the hydraulic pressure supplier so that said locking mechanism is released by said unlocking mechanism, wherein the hydraulic pressure supplier to said retarding hydraulic chamber and said advancing hydraulic chamber are controlled to effect a retarding control of said relative phase or alternatively an advancing control thereof; and
        when it is detected that said engine is operating in a cold-state idling operation mode, is designed to set said relative phase to a most advanced position or alternatively to a most retarded position and to store a relative phase difference between a detection value of said crank angle sensor and a detection value of said cam angle sensor at said most advanced position or alternatively at said most retarded position as a reference position.

2. A valve timing control system for an internal combustion engine according to claim 1,
    wherein said control unit is designed to set a direction in which said cam shaft is controlled such that temperature of exhaust gas of said engine rises, when said engine is in said cold-state idling operation mode.

3. A valve timing control system for an internal combustion engine according to claim 1,
    wherein when it is detected that said reference position has not been stored and said engine is in a warm-up state, said control unit sets said relative phase of said cam shaft to said most advanced position or alternatively to said most retarded position and stores said relative phase difference between the detected value of said crank angle sensor and the detection value of said cam angle sensor as said reference position.

4. A valve timing control system for an internal combustion engine according to claim 3,
    wherein said control unit is designed to set a direction in which said cam shaft is controlled upon storing said reference position in said warn-up state to be substantially the same as said control direction in said cold-state idling operation mode.

5. A valve timing control system for an internal combustion engine according to claim 3,
    wherein said control unit is designed to modify control of said internal combustion engine upon learning of said reference position in said warn-up state.

6. A valve timing control system for an internal combustion engine according to claim 5,
    wherein said control unit is designed to control at least one of a fuel injection quantity, an ignition timing, and opening degrees of an idle speed control valve and a throttle valve upon storing said reference position in said warm-up state to thereby regulate an output torque of said internal combustion engine so that the operating state of said engine becomes substantially the same as the state before storing said reference position.

7. A valve timing control system for an internal combustion engine according to claim 1, wherein said control unit is designed such that when said relative phase of said cam shaft is controlled in a direction toward the most retarded position or alternatively toward the most advanced position so that overlap of operation between said intake valve and said exhaust valve is decreased in the course of an ordinary control of said relative phase of said cam shaft, the detection value of said cam angle sensor is stored as a second reference position.

8. A valve timing control system for an internal combustion engine according to claim 7, wherein said control unit is designed so that in the case where the control direction is set toward the most advanced position upon learning of said reference position for storage, the most retarded position taken by the intake valve during the ordinary valve timing control is stored as said second reference position.

9. A valve timing control system for an internal combustion engine according to claim 7, wherein said control unit is designed to make use of said second reference position and said reference position stored during said cold-state idling operation mode for performing arithmetic operation for controlling said valve timing.

10. A valve timing control system for an internal combustion engine according to claim 1, wherein said control unit is designed to control the rotation speed of said internal combustion engine so that said rotation speed increases when said engine operating state is in the cold-state idling operation mode.

11. A valve timing control system for an internal combustion engine according to claim 1, wherein said control unit is designed to control ignition timing of said internal combustion engine such that said ignition timing is retarded when it is detected that said engine operating state is in said cold-state idling operation mode.

12. A valve timing control system for an internal combustion engine according to claim 1, wherein said control unit is designed to control a fuel injection quantity such that said fuel injection quantity is decreased when it is detected that said engine operating state is in said cold-state idling operation mode.

* * * * *